(12) United States Patent
Badalone et al.

(10) Patent No.: US 12,008,115 B2
(45) Date of Patent: Jun. 11, 2024

(54) SYSTEM AND METHOD FOR PRIVACY-AWARE ANALYSIS OF VIDEO STREAMS

(71) Applicant: C2RO Cloud Robotics Inc., Montreal (CA)

(72) Inventors: Riccardo Badalone, Saint-Lazare (CA); Soodeh Farokhi, Verdun (CA); Amir Abbas Haji Abolhassani, Montreal (CA); Felix-Olivier Duguay, Greenfield Park (CA); Neil Barrett, Longueuil (CA); Mostafa Erfani, Brossard (CA); Aldo Enrique Vargas Moreno, Montreal (CA)

(73) Assignee: C2RO Cloud Robotics Inc., Montreal (CA)

( * ) Notice: Subject to any disclaimer, the term of this patent is extended or adjusted under 35 U.S.C. 154(b) by 662 days.

(21) Appl. No.: 17/168,654

(22) Filed: Feb. 5, 2021

(65) Prior Publication Data
US 2021/0240851 A1    Aug. 5, 2021

Related U.S. Application Data

(60) Provisional application No. 63/085,515, filed on Sep. 30, 2020, provisional application No. 62/970,482, filed on Feb. 5, 2020.

(51) Int. Cl.
*G06F 21/60* (2013.01)
*G06F 16/73* (2019.01)
(Continued)

(52) U.S. Cl.
CPC .............. *G06F 21/60* (2013.01); *G06F 16/73* (2019.01); *G06F 16/784* (2019.01);
(Continued)

(58) Field of Classification Search
CPC ........ G06F 21/60; G06F 16/73; G06F 16/784; G06F 21/6254; G06F 21/32; G06F 21/31;
(Continued)

(56) References Cited

U.S. PATENT DOCUMENTS

| 2014/0184803 A1* | 7/2014 | Chu ...................... G06T 7/292 348/159 |
| 2014/0347475 A1 | 11/2014 | Divakaran |

(Continued)

FOREIGN PATENT DOCUMENTS

| JP | 2019-149006 A | 9/2019 |
| WO | WO 2009/111498 A1 | 9/2009 |

OTHER PUBLICATIONS

International Search Report and Written Opinion in International Patent Application No. PCT/CA2021/050131, dated Apr. 29, 2021 (11 pages).

(Continued)

*Primary Examiner* — Nimesh Patel
(74) *Attorney, Agent, or Firm* — Nixon Peabody LLP

(57) ABSTRACT

A method and system for privacy-aware movement tracking includes receiving a series of images of a field of view, such as captured by a camera. The images containing movement of an unidentified person within the field of view. A body region corresponding to the person is detected within the images. A movement dataset for the unidentified person is generated based on tracking movement of the body region over the fired of view within the images is generated. A characterizing feature set is determined for the unidentified person. The set is associated within the movement dataset to form a first track entry. Anonymizing of the body region can be applied to remove identifying features while or prior to determining the characterizing feature set. A second track entry can be generated from a second series of images and match between the track entries can be determined. A (Continued)

method and system for privacy-aware operation and learning of a computer-implemented classification module is also contemplated.

30 Claims, 26 Drawing Sheets

(51) Int. Cl.
*G06F 16/783* (2019.01)
*G06F 21/62* (2013.01)
*G06V 20/40* (2022.01)
*G06V 20/52* (2022.01)
*G06V 40/16* (2022.01)
*G06V 10/22* (2022.01)

(52) U.S. Cl.
CPC .......... *G06F 21/6254* (2013.01); *G06V 20/48* (2022.01); *G06V 20/52* (2022.01); *G06V 40/167* (2022.01); *G06V 10/22* (2022.01)

(58) Field of Classification Search
CPC ...... G06F 12/1408; G06F 21/10; G06F 21/16; G06F 21/33; G06F 21/86; G06F 21/6245; G06F 3/0481; G06F 21/6218; G06F 21/35; G06F 21/34; G06F 2221/2141; G06F 16/285; G06F 18/22; G06F 21/64; G06F 21/71; G06F 16/434; G06F 16/00; G06F 13/20; G06F 16/435; G06F 16/436; G06F 21/30; G06F 21/62; G06F 21/6227; G06F 21/57; G06F 21/50; G06F 21/88; G06F 2221/2113; G06F 2221/2137; G06V 20/48; G06V 20/52; G06V 40/167; G06V 10/22; G06V 40/70; G06V 40/1365; G06V 40/172; G06V 40/45; G06V 40/117; G06V 40/1394; G06V 40/50; G06V 40/197; G06V 40/193; G06V 40/19; G06V 40/1388; G06V 40/161; G06V 40/171; G06V 10/10; G06V 10/82; G06V 20/64; G06V 40/10; G06V 40/173; G06V 40/20; G06V 40/1371; G06V 40/1359; G06V 40/1376; G06V 40/1382; G06V 40/16; H04W 4/029; H04W 12/02; H04W 12/06; H04W 4/021; H04W 12/065; H04W 12/65; H04W 12/33; H04W 12/08; H04W 12/03; H04W 12/069; H04W 12/12; H04W 12/40; H04W 12/50; H04W 12/63; H04W 12/68; H04W 4/023; H04W 4/027; H04W 4/33; H04W 4/38; H04L 63/0861; H04L 63/08; H04L 63/20; H04L 9/3231; H04L 9/3263; H04L 2463/101; H04L 63/10; H04L 2463/082; H04L 63/0884; H04L 47/70; H04L 63/101; H04L 67/535; G06T 1/0021; G06T 19/006; G06T 7/00; G06T 19/003; G06T 2207/10048; G06T 2207/20081; G06T 7/11; G06T 7/20; G06N 20/00; G06N 3/045; G06N 7/01; G06N 3/02; G06N 3/044; G06N 3/08; G06N 3/084; G06N 5/02

See application file for complete search history.

(56) References Cited

U.S. PATENT DOCUMENTS

| | | | |
|---|---|---|---|
| 2015/0006376 A1* | 1/2015 | Nuthulapati | G07F 7/0853 705/41 |
| 2018/0124047 A1* | 5/2018 | Fisher | H04L 63/0861 |
| 2018/0129900 A1 | 5/2018 | Kiraly | |
| 2018/0351925 A1* | 12/2018 | Badri | H04L 63/105 |
| 2019/0042851 A1 | 2/2019 | Varadarajan | |

OTHER PUBLICATIONS

Extended European Search Report in European Patent Application No. 211556279, dated May 10, 2021 (10 pages).

Examination Report in related Canadian Patent Application No. 3,169,565, dated Sep. 21, 2023 (5 pages).

* cited by examiner

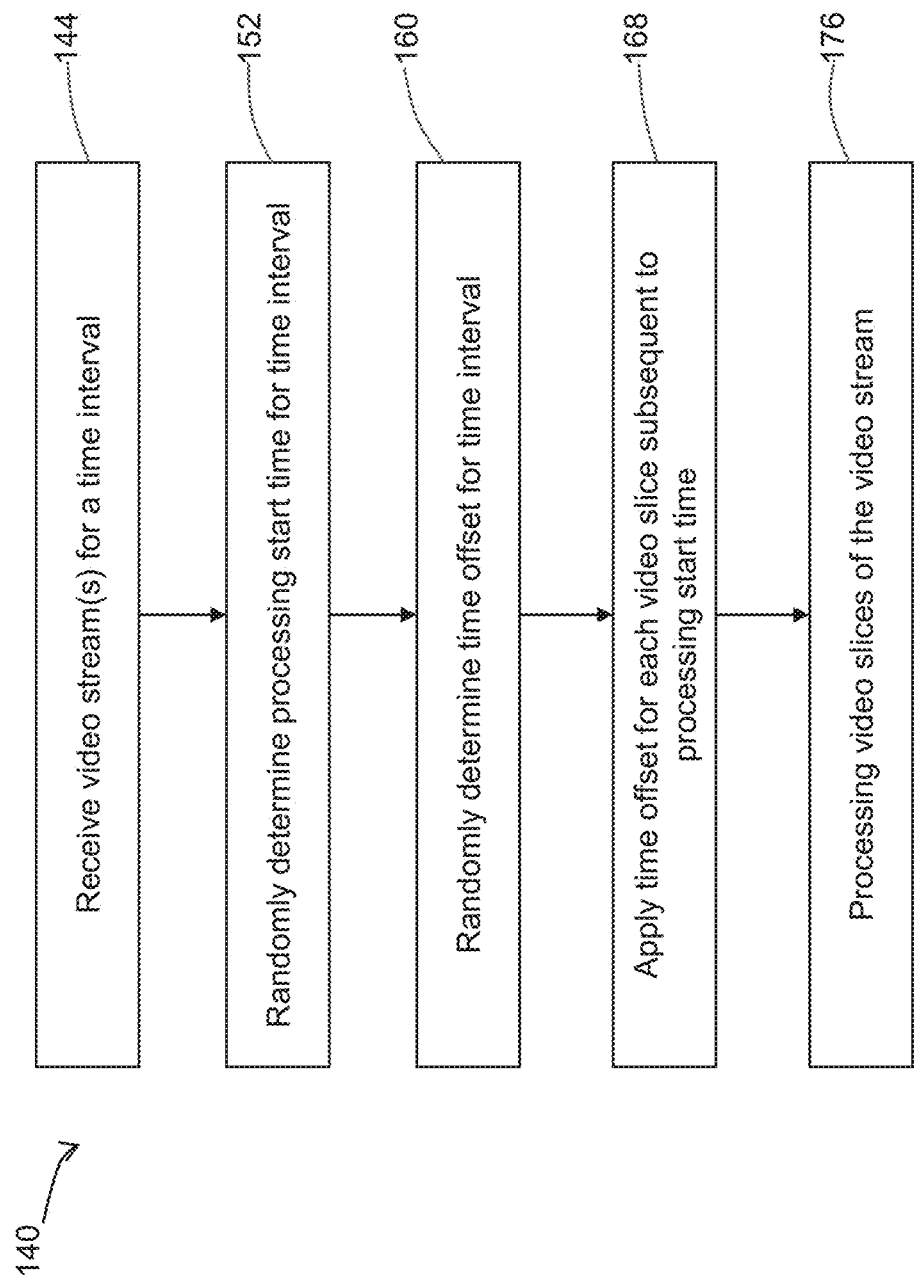

| Data Item | Source Video | Local System | Global System | Notes |
|---|---|---|---|---|
| Timestamp | Yes | Yes | No | |
| Camera ID and Zone ID | Yes | Yes | Yes | |
| Individual Journey | No | No | No | |
| Journey by Demographic class | No | No | Yes | |
| Dwell Time by Demographic class | No | No | Yes | |
| Traffic Count | No | Yes | Yes | |
| Unlabeled Face Images | | Yes | | Anonymizing: The image-IR sources from source to images, the labeled images to be used for training; at training; and then delined immediately after processing. |
| Body Image | Yes | Yes | No | |
| Face template | No | No | No | |
| Body Template with Face | No | No | No | |
| Body Images without Face | | | Yes | Faces are removed 6 min of processing. Body templates are obtained; a contain clothes & may have color. |
| Body Template without Face | No | No | Yes | |
| Anonymized Individual ID | No | No | No | |
| Gender | No | Yes | Yes | |
| Age | No | Yes | Yes | |
| Corpulence | No | No | No | |
| Emotions | No | No | No | |
| Group Traffic | No | Yes | Yes | |
| Speed of Travel | No | Yes | Yes | |
| Gaze (direction & time) | No | Yes | Yes | |
| Accessories | No | Yes | Yes | |

SYSTEM AND METHOD FOR PRIVACY-AWARE ANALYSIS OF VIDEO STREAMS

RELATED PATENT APPLICATION

The present application claims priority from U.S. provisional patent application No. 62/970,482, filed Feb. 5, 2020 and entitled "SYSTEM AND METHOD FOR PRIVACY-AWARE ANALYSIS OF VIDEO STREAMS" and from U.S. provisional patent application No. 63/085,515, filed Sep. 30, 2020 and entitled "SYSTEM AND METHOD FOR PRIVACY-AWARE OPERATION AND LEARNING OF A COMPUTER-IMPLEMENTED CLASSIFICATION MODULE", the disclosure of which is hereby incorporated by reference in its entirety.

TECHNICAL FIELD

The present disclosure generally relates, in one aspect, to a method and system for privacy-aware classification via analysis of video streams. Such classification may include the privacy-aware processing of images (ex: video streams) of persons captured by cameras covering a tracked space to determine, in a privacy-aware manner, movement of the persons within the tracked space, such as to carry out foot traffic and behaviour analysis and/or demographic classification.

The present disclosure generally relates, in another aspect, to a method and system for privacy-aware operation of a computer-implemented classification module, and more particularly, to the machine learning of the computer-implemented classification module in a restricted manner to ensure compliance with at least one privacy-related regulation.

BACKGROUND

In an increasing number of applications, the generating of data pertaining to behavior by users is gaining increasing importance. For example, understanding user behavior can be useful in understanding how to improve and/or provide customized services to users.

In a foot traffic analysis and/or demographic classification application, images of users in a space (typically a public space) are captured (ex: such as by surveillance camera systems) and are analyzed. This analysis can determine certain trends that can be used to deliver improved and/or customized services in the future. A particular example can be the analysis of foot traffic and/or demographic classification in a shopping mall or a particular store to analyze shopping behavioral trends. Other examples of foot traffic analysis and/or demographic classification can include analysis in infrastructure spaces (ex: airports, subway stations) or office buildings.

Privacy issues in the capturing of data pertaining to user behavior has become a particularly important concern. Such issues include how various organizations (public or private organizations) can collect, store, analyze and share such data. Various laws and regulations have also been put in place to define the boundaries related the collection of private data.

SUMMARY

According to one aspect, there is provided a method for privacy-aware movement tracking, the method comprising:
receiving a first series of images containing movement of a first unidentified person;
generating a first movement dataset for the first unidentified person based on tracking movement of the first unidentified person within the first series of images;
determining a first characterizing feature set for the first unidentified person;
associating the first characterizing feature set with the first movement dataset, thereby forming a first track entry;
receiving a second series of images containing movement of a second unidentified person;
generating a second movement dataset for the second unidentified person based on tracking movement of the second unidentified person within the second series of images;
determining a second characterizing feature set for the second unidentified person;
associating the second characterizing feature set with the second movement dataset, thereby forming a second track entry; and
determining a match between the first track entry and the second track entry.

According to yet another aspect, there is provided a system for performing privacy-aware movement tracking, the system comprising:
at least one processor;
at least one memory coupled to the processor and storing instructions executable by the processor and that such execution causes the processor to perform operations comprising:
receiving a first series of containing movement of a first unidentified person;
generating a first movement dataset for the first unidentified person based on tracking movement of the first unidentified person within the first series of images;
determining a first characterizing feature set for the first unidentified person;
associating the first characterizing feature set with the first movement dataset, thereby forming a first track entry;
receiving a second series of images containing movement of a second unidentified person;
generating a second movement dataset for the second unidentified person based on tracking movement of the second unidentified person within the second series of images;
determining a second characterizing feature set for the second unidentified person;
associating the second characterizing feature set with the second movement dataset, thereby forming a second track entry; and
determining a match between the first track entry and the second track entry.

According to an example embodiment, determining a match between the first track entry and the second track entry comprises determining a matching level between the first characterizing feature set and the second characterizing feature set.

According to an example embodiment, the first series of images are captured of a first field of view and the second series of images are captured of a second field of view.

According to an example embodiment, the first series of images is captured by a first camera having the first field of view and the second series of images is captured by a second camera having the second field of view.

According to an example embodiment, determining the match includes determining whether the first track entry and the second track entry satisfy a set of constraints predetermined according to a physical relationship between the first field of view and the second field of view.

According to an example embodiment, determining the match between the first track entry and the second track entry is based on one or more of physical/time constraints, demographic constraints and color/accessories matching.

According to an example embodiment, determining the match between the first track entry and the second track entry indicates the first unidentified person and the second unidentified person are the same real-world person.

According to an example embodiment, if a match between the first track entry and the second track entry is determined, linking the first movement dataset and the second movement dataset.

According to an example embodiment, the method or system further includes: for at least one given image of the first series of images, anonymizing a first body region corresponding to the first unidentified person by applying at least one removal of identifying features within the first body region, thereby generating a first anonymized body region; and for at least one given image of the second series of images, anonymizing a second body region corresponding to the second unidentified person by applying at least one removal of identifying features within the second body region, thereby generating a second anonymized body region, wherein the first characterizing feature set for the first unidentified person is determined based on processing of the first anonymized body region, the first characterizing feature set based on the first anonymized body region is associated with the first movement dataset to form the first track entry, the second characterizing feature set for the second unidentified person is determined based on processing of the second anonymized body region, the second characterizing feature set based on the second anonymized body region is associated with the second movement dataset to form the second track entry.

According to an example embodiment, the at least one removal of identifying features within the first body region comprises removal of at least one uniquely identifying biometric feature and the at least one removal of identifying features within the second body region comprises removal of at least one uniquely identifying biometric feature.

According to an example embodiment, the at least one removal of identifying features within the first body region comprises removal of any uniquely identifying biometric feature and the at least one removal of identifying features within the second body region comprises removal of any uniquely identifying biometric feature.

According to an example embodiment, at least one removal of identifying features within the first body region includes detecting a first face subregion within the first body region and masking the detected first face subregion; and the at least one removal of identifying features within the second body region includes detecting a second face subregion within the second body region and masking the detected second face subregion.

According to one example embodiment, the at least one removal of identifying features within the first body comprises randomly distorting the first body region to remove a silhouette of the first body region as a uniquely identifying feature and the at least one removal of identifying features within the second body comprises randomly distorting the second body region to remove a silhouette of the second body region as a uniquely identifying feature.

According to an example embodiment, randomly distorting the first body region includes modifying the first body region by a first random aspect ratio and randomly distorting the second body region comprises modifying the second body region by a second random aspect ratio.

According to an example embodiment, the first characterizing feature set comprises a color pattern and accessory feature set.

According to an example embodiment, the first characterizing feature set comprises one or more of color features, clothing features and personal accessory features.

According to an example embodiment, the first characterizing feature set is insufficient for determining a unique identity of the first unidentified person and the second characterizing feature set is insufficient for determining a unique identity of the second unidentified person.

According to an example embodiment, the first characterizing feature set is determined free of applying any biometric template generation and the second characterizing feature set is determined free of applying any biometric template generation.

According to an example embodiment, anonymizing the first body region and anonymizing the second body region are carried out at a secured network location.

According to an example embodiment, the secured network location is shared with a surveillance system having a plurality of cameras, including the first camera and the second camera.

According to another aspect, there is provided a method for processing a set of at least one video stream, the method comprising:
  for a first time interval of the video stream, dividing the video stream of the first time interval into a plurality of video slices, each video slice being a time length less than a threshold duration;
  randomly determining a first processing start time;
  for each video slice of the first time interval subsequent to the randomly determined first processing start time:
    adjusting the time stamp of the slice by a random first time offset associated to the first time interval, the same random first time offset being applied to every video slice; and
    processing the video slice to determine features of one or more persons captured in the video slice.

According to yet another aspect, there is provided a system for processing a set of at least one video stream, the system comprising:
  at least one processor;
  at least one memory coupled to the processor and storing instructions executable by the processor and that such execution causes the processor to perform operations comprising:
  for a first time interval of the video stream, dividing the video stream of the first time interval into a plurality of video slices, each video slice being a time length less than a threshold duration;
  randomly determining a first processing start time;
  for each video slice of the first time interval subsequent to the randomly determined first processing start time:
    adjusting the time stamp of the slice by a random first time offset associated to the first time interval, the same random first time offset being applied to every video slice; and
    processing the video slice to determine features of one or more persons captured in the video slice.

According to an example embodiment, the time spent processing the slice is less than the time length of the video slice.

According to an example embodiment, the threshold duration is legislatively defined.

According to an example embodiment, randomly determining a first processing start time comprises randomly selecting a starting video slice from the plurality of video slices.

According to an example embodiment, the starting video slice is randomly selected from a subset of video slices falling within a subinterval of the first time interval.

According to an example embodiment, the subinterval corresponds to a first hour of the first time interval.

According to an example embodiment, the set of at least one video stream comprises a plurality of streams captured by a plurality of cameras; each video stream is divided into the plurality of video slices; the same randomly determined first processing start time is applied for each of the video streams; and the time stamps of each of the slices of each of the video streams is adjusted by the same random first time offset.

According to an example embodiment, the system or method further includes for a second time interval of the video stream, dividing the video stream of the second time interval into a plurality of video slices, each video slice being a time length less than the threshold duration; randomly determining a second processing start time, the second processing start time being determined independently of the first processing start time; for each video slice of the second time interval subsequent to the randomly determined second processing start time: adjusting the time stamp of the slice by a random second time offset associated to the second time interval, the same second time offset being applied to every video slice of the second time interval; and processing the video slice to determine features of one or more persons captured in the video slice.

According to an example embodiment, processing the video slice comprises carrying out privacy-aware classification of captured images of persons according to the method for privacy-aware movement tracking described herein according to various example embodiments.

According to yet another aspect, there is provided a method of privacy-aware analysis of video streams, the method comprising:
receiving, at a first network location, a plurality of video streams each captured by a respective one of a plurality of cameras, each camera having a respective field of view;
processing, at the first network location, the video streams to determine, for each of a plurality of unidentified persons captured in the video streams, a track entry having movement dataset indicating movement of the person and a characterizing feature set for the person;
storing the plurality of tracking entries;
processing the plurality of track entries to generate a report representing movement of the plurality of persons;
making the report available at a second location network remote of the first network location.

According to yet another aspect, there is provided a system for privacy-aware analysis of video streams, the system comprising:
a first network location having a first processor and at least one memory coupled to the first processor and storing instructions executable by the first processor and that such execution causes the processor to perform operations comprising:
receiving a plurality of video streams each captured by a respective one of a plurality of cameras, each camera having a respective field of view;
processing, at the first network location, the video streams to determine, for each of a plurality of unidentified persons captured in the video streams, a track entry having movement dataset indicating movement of the person and a characterizing feature set for the person;
storing the plurality of tracking entries; and
a second network location remote of the first network location, having a second processor and at least one memory coupled to the second processor and storing instructions executable by the second processor and that such execution causes the processor to perform operations comprising:
making the report available from the second location network;
wherein at least one of the first processor and the second processor is configured for processing the plurality of track entries to generate the report representing movement of the plurality of persons.

According to an example embodiment, processing the plurality of track entries to generate a report representing movement of the plurality of persons is carried out at the second network location.

According to an example embodiment, the received track entries are not available when the report is made available from the second network location.

According to an example embodiment, the video stream from each camera is first processed individually to determine the plurality of track entries; and the track entries for each video stream are stored independently of the track entries for any other video stream of the plurality of video streams.

According to an example embodiment, processing the plurality of track entries comprises: determining a correspondence amongst a given set of track entries from at least two video streams based on a matching of the characterizing feature sets stored in the given set of track entries; merging the matching track entries as a journey entry; and the report is generated based on the journey entry.

According to an example embodiment, processing the video stream comprises for each series, performing the privacy-aware movement tracking described herein according to various example embodiments.

According to an example embodiment, the video streams are processed according to the method for processing a set of at least one video stream described herein according to various example embodiments.

According to yet another aspect, there is provided method for privacy-aware operation of a computer-implemented classification module, the method comprising:
receiving a plurality of data elements captured for one or more unidentified persons present at a monitored geographic location;
training the computer-implemented classification module by machine learning using a first set of the data elements, at least one processing restriction being applied to the training to ensure compliance with at least one privacy-related regulation.

According to yet another aspect, there is provided a privacy-aware training-enabled analysis system comprising one or more computing nodes implementing a computer-implemented classification module, the operation of the computer-implemented classification module comprising:
receiving a plurality of data elements captured for one or more unidentified persons present at a monitored geographic location;
training the computer-implemented classification module by machine learning using a first set of the data elements, at least one processing restriction being applied to the training to ensure compliance with at least one privacy-related regulation.

According to an example embodiment, the at least one privacy-related regulation comprises regulation, legislation and/or protocols applicable for the monitored geographic location.

According to an example embodiment, the at least one privacy-related regulation comprises General Data Protection Regulation (GDPR).

According to an example embodiment, the at least one processing restriction comprises a temporal restriction applied to the training.

According to an example embodiment, the at least one processing restriction comprises a geographic restriction applied to the training.

According to an example embodiment, the plurality of data elements are images captured of the unidentified persons.

According to an example embodiment, the images are taken from video streams captured of the unidentified persons.

According to an example embodiment, the method or system further includes operating the computer-implemented classification module to process a second set of the data elements, the at least one processing restriction being applied to the operating of the computer-implemented classification module.

According to an example embodiment, the first set of data elements are used as training data elements, and wherein the training comprises: for each given one of the training data elements of the first set, training the computer-implemented classification module by machine learning using the given training data elements at at least one learning geographic location having a geographic commonality with the monitored geographic location.

According to an example embodiment, a second set of the received data elements are used as operational data elements and the method or system further includes for each given one of the operational data elements, operating the computer-implemented classification module to process the given operational data element to determine a respective contextual dataset, the computer-implemented classification module being operated at at least one operational geographic location each having the geographic commonality with the monitored geographic location.

According to an example embodiment, the computer-implemented classification module determines the contextual dataset based on biometric features of a person captured in the operational data element.

According to an example embodiment, the processing of the plurality of received data elements by the computer-implemented classification module when in training is restricted at any location lacking geographic commonality with the monitored geographic location.

According to an example embodiment, training the computer-implemented classification module by machine learning comprises querying a human expert and receiving an annotation for the training data element, the training data element being displayed to the human expert at at least one annotating geographic location each having geographic commonality with the monitored geographic location.

According to an example embodiment, the boundaries of the geographic commonality is defined by the at least one privacy-related regulation.

According to an example embodiment, for each given one of the training data elements: training of the computer-implemented classification module by machine learning using the training data element is completed within a training time interval after receiving the training data element, the training time interval being shorter than a predetermined temporal threshold duration.

According to an example embodiment, training the computer-implemented classification module by machine learning comprises querying a human expert and receiving an annotation for the training data element from the human expert, the training data element being displayed to the human expert, the annotation being received and the training of the computer-implemented classification by machine learning with the annotated training data element being completed within the training time interval after receiving the training data element.

According to an example embodiment, the predetermined temporal threshold duration is defined by the at least one privacy-related regulation.

According to an example embodiment, for each given one of the operational data elements: processing of the operational data element by the computer-implemented classification module to determine the contextual dataset is completed within an operating time interval after receiving the given operational data element, the operating time interval being shorter than a predetermined temporal threshold duration.

According to an example embodiment, the computer-implemented classification module is initially trained with an initial training dataset captured at locations other than the monitored geographic location.

According to an example embodiment, the first set of data elements are used as training data elements and wherein the training comprises: for each given one of the training data elements of the first set, training the computer-implemented-classification module by machine learning using the given training data element, the training being completed within a training time interval after receiving the training data element, the training time interval being shorter than a predetermined temporal threshold duration.

According to an example embodiment, wherein a second set of the received data elements are used as operational data elements, the method or system further includes: for each given one of the operational data elements, operating the computer-implemented classification module to process the operational data element to determine a respective contextual dataset, the processing being completed within a processing time interval after receiving the given operational data element, the processing time interval being shorter than the predetermined temporal threshold duration.

According to an example embodiment, the computer-implemented classification module determines the contextual dataset based on biometric features of a person captured in the operational data element.

According to an example embodiment, training the computer-implemented classification module by machine learning comprises querying a human expert and receiving an annotation for the training data element, the training data element being displayed to the human expert, the annotation being received and the training of the computer-implemented classification by machine learning with the annotated training data element being completed within the training time interval after receiving the training data element.

According to an example embodiment, the predetermined temporal threshold duration is defined by the at least one privacy-related regulation.

According to an example embodiment, the first set of data elements are used as training data elements and the training comprises:
- for each given one of a first subset of the training data elements, training the first computer-implemented classification module by machine learning using the given training data element of the first set at at least one first learning geographic location having a geographic commonality with the monitored geographic location and the training of the first computer-implemented classification module by machine learning using the training data element of the first subset being completed within a first training time interval after receiving of the training data element of the first subset, the first training time interval being shorter than a predetermined temporal threshold duration;
- for each given one of a second subset of the training data elements, anonymizing the given training data element of the second subset, whereby a person captured in the anonymized training data element is unidentifiable; and
- training the second computer-implemented classification module by machine learning using the anonymized training data element, the training of the second computer-implemented classification module being non-restricted to any location having the geographic commonality with the monitored geographic location.

According to an example embodiment, a second set of the received data elements are used as operational data elements and the method or system further includes for each given one of the operational data elements:
- operating a first computer-implemented classification module to process the given operational data element to determine a respective contextual dataset, the computer-implemented classification module being operated at at least one operational geographic location having the geographic commonality with the monitored geographic location and the processing of the operational data element by the first computer-implemented classification module to determine the contextual dataset being completed within a first processing time interval after receiving of the given operational data element, the processing time interval being shorter than the predetermined temporal threshold duration;
- anonymizing the operational data element within the first processing time interval, whereby a person captured in the anonymized operational data element is unidentifiable;
- operating a second computer-implemented classification module to process the given anonymized operational data element to determine a respective characterizing feature dataset, the operating of the second computer-implemented classification module being non-restricted to any location having the geographic commonality with the monitored geographic location.

According to an example embodiment, the second computer-implemented classification module is operated at at least one second operational geographical location each being located outside boundaries of geographic commonality with the monitored geographical location and wherein the second computer-implemented classification module is trained at at least one second training geographical location each being located outside boundaries of geographic commonality with the monitored geographical location.

According to an example embodiment, the processing of the anonymized operational data element by the second computer-implemented classification module to determine the characterizing feature dataset is completed within a second processing time interval after receiving of the operational data element, the second processing time interval being longer than the predetermined temporal threshold duration.

According to an example embodiment, the first computer-implemented classification module determines the contextual dataset based on biometric features of the operational data element; and the second computer-implemented classification module determines the characterizing feature dataset based on non-biometric features of the anonymized operational data element.

According to an example embodiment, the training of the second computer-implemented classification module by machine learning using the training data element of the second subset is completed within a second training time interval after capture of the training data element, the second training time interval being longer than the predetermined temporal threshold duration.

According to an example embodiment, training the first computer-implemented classification module by machine learning comprises querying a first human expert and receiving an annotation for the training data element of the first subset, the training data element of the first subset being displayed to the human expert at at least one first annotating geographic location each having geographic commonality with the monitored geographic location and the training data element of the first subset being displayed to the human expert, the annotation being received and the training of the first computer-implemented classification by machine learning with the annotated training data element of the first subset being completed within the first training time interval after receiving the training image of the first subset; and training the second computer-implemented classification module by machine learning comprises querying a second human expert and receiving an annotation for the training data element of the second subset, the training data element being displayed to the second human expert at at least one second annotating geographic location each being non-restricted to having the geographic commonality with the monitored geographic location.

According one aspect, there is provided a non-transitory computer-readable medium storing computer executable instructions that when executed by a processor performs the steps of the methods described herein according to various example embodiments.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 4d illustrates a schematic diagram showing operational steps of a method for privacy-aware processing of at least one video stream according to one example embodiment;

FIG. 14 is a table showing a breakdown of types of images and their permitted storage according to one example embodiment;

Figure 1:
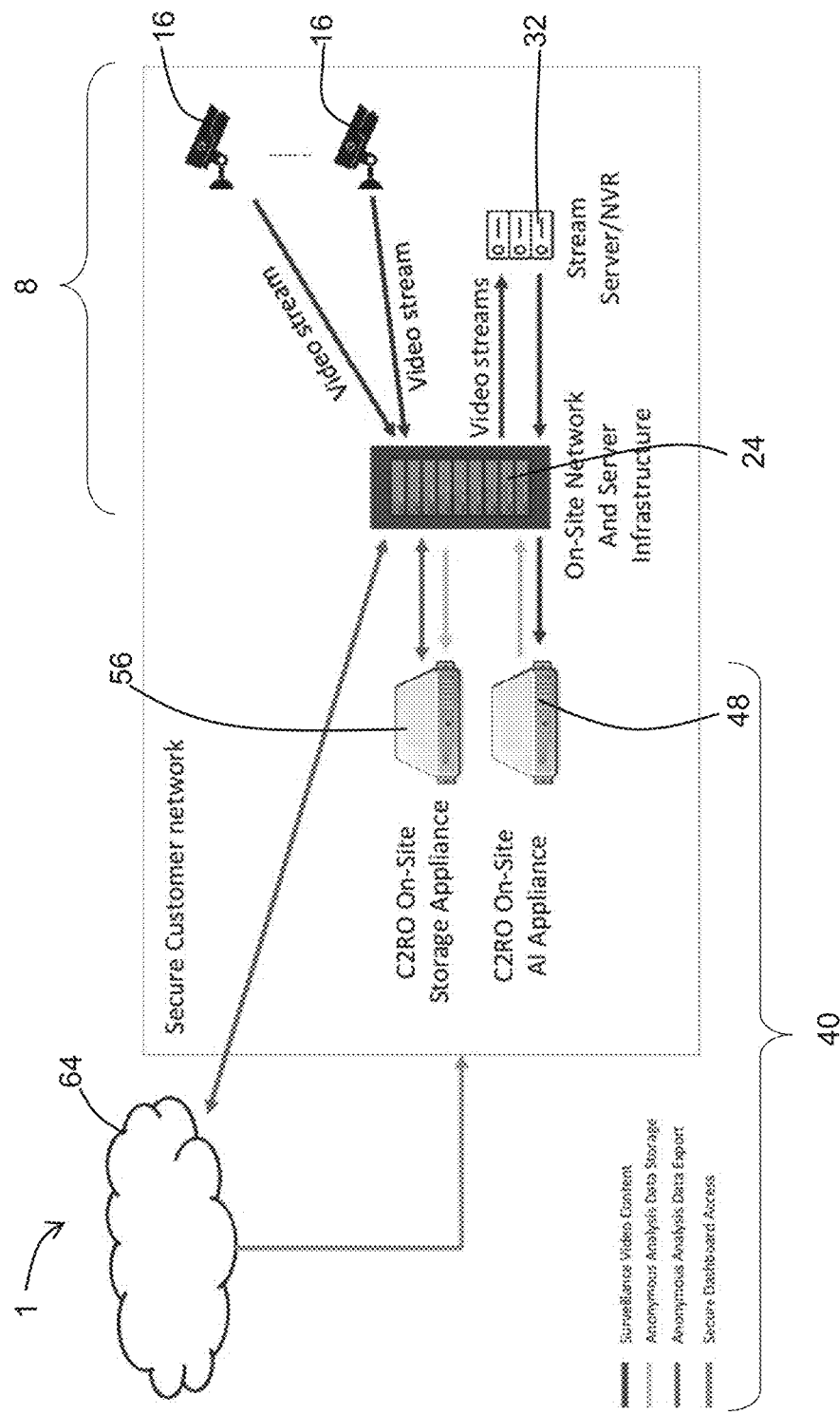
FIG. 1 illustrates a schematic diagram of a privacy-aware video stream analysis system according to one example embodiment.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

As should be appreciated, various embodiments described herein may also be implemented as methods, apparatus, systems, computing devices, computing entities, and/or the like. As such, embodiments may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations. Such devices can each comprise at least one processor, a data storage system (including volatile and non-volatile memory and/or storage elements). For example, and without limitation, the programmable computer may be a programmable logic unit, a mainframe computer, server, personal computer, cloud-based program or system, laptop, personal data assistant, cellular telephone, smartphone, wearable device, tablet device, virtual reality devices, smart display devices (ex: Smart TVs), set-top box, video game console, or portable video game devices.

Embodiments of the present are described below with reference to block diagrams and flowchart illustrations. Thus, it should be understood that each block of the block diagrams and flowchart illustrations, respectively, may be implemented in the form of a computer program product, an entirely hardware embodiment, a combination of hardware and computer program products, and/or apparatus, systems, computing devices, computing entities, and/or the like carrying out instructions on a computer-readable storage medium for execution. Such embodiments can produce specifically-configured machines performing the steps or operations specified in the block diagrams and flowchart illustrations. Accordingly, the block diagrams and flowchart illustrations support various combinations of embodiments for performing the specified steps or operations.

The term "privacy-aware" is used herein to generally describe methods and systems that process privacy-sensitive information in a manner that particularly considers privacy-related issues, such as to ensure compliance with applicable privacy-related legislation, protocols or regulations (ex: General Data Protection Regulation (GDPR)).

The term "unidentified person" herein refers to a person captured within image(s) of a video stream for whom no processing steps have been applied to uniquely identify that person.

The term "uniquely identify" or variants thereof herein refers to applying processing steps to image(s) of a person captured within a video stream with the goal of determining a unique identifier for the person. In this way, the person can be identified in a unique way and distinguished from any other person that would be captured within any video streams or elsewhere.

The term "uniquely identifying feature" or variants thereof herein refers to a feature found in a video stream or other captured data that would permit the unique identification of a person captured within data. In various example embodiments, a uniquely identifying feature can include biometric features of the person.

The term "anonymize" herein refers to applying an active step to remove at least one feature within captured data that would permit the identification of a person found within the captured data.

Referring now to FIG. 1, therein illustrated is a schematic diagram of the operational modules of a privacy-aware video stream analysis system 1 according to an example embodiment. It will be understood that the privacy-aware video stream analysis system 1 can include existing infrastructure as well as add-on modules (hardware and/or software). The privacy-aware video stream analysis system 1 can also include hardware modules and/or software modules that are located at different locations, such as at different network locations. It will be understood references to systems, subsystems and/or modules herein can refer to add-on modules alone or a combination of add-on modules with existing infrastructures. Furthermore, references to systems, subsystems and/or modules herein can also refer to subsystems or modules located at the same network location or to subsystems or modules located at more than one network location.

Continuing with FIG. 1, the privacy-aware video stream analysis system 1 includes a camera subsystem 8. The camera subsystem 8 includes a plurality of cameras 16, each generating a respective captured video stream, and a server 24 operable to receive the captured video streams, store the streams, and make available the streams for viewing or analysis. The server 24 can include one or more network video recorders 32 for storing the streams. The cameras 16 can be IP cameras that record video streams in a digital format. The camera subsystem 8, and in particular the server 24 and network video recorders 32 are secured, which includes physical security (physical access to the physical cameras and servers is restricted) and network security (digital access to data in the video streams is also restricted). It will be understood that the server can include, or consist of, the IT network and server infrastructure (the collection of switches, routers and servers running operating systems and network configurations, etc. for example that support a local surveillance camera system).

As is known in the art, each camera 16 has a respective field of view and is deployed at a respective location within a monitored physical space (ex: shopping mall, airport, office building, etc). The video stream of each camera includes images of objects passing through its given field of view over time. The aggregation of the field of views of the cameras 16 within the camera subsystems should provide coverage of the monitored physical space. According to various example embodiments, the camera subsystem 8 represents existing infrastructure in that they are already deployed and in use (ex: a pre-existing surveillance camera system), and the privacy-aware video stream analysis capabilities are installed afterwards.

Continuing with FIG. 1, the privacy-aware video stream analysis system 1 further includes a privacy-aware processing subsystem 40 that is configured to carry out privacy-aware processing of the video streams. The video streams may be video streams captured by the cameras 16 of the camera subsystem 8. The privacy-aware processing subsystem 40 includes a privacy-aware tracking module 48, a privacy-aware storage module 56, and a traffic analysis module 64.

The privacy-aware tracking module 48 is configured to carry out privacy-aware of tracking of unidentified persons captured within the video streams and to output anonymized intermediate data at a first level of granularity, referred to herein after as track entries. The data outputted by the privacy-aware tracking module 48 is stored at the privacy-aware storage module 56 and is made available to the traffic analysis module 64 for further processing. The traffic analysis module 64 can output anonymized analyzed data describing the movement of persons captured in the video streams at a second level of granularity. The anonymized analyzed data describes movements of the persons in an aggregated manner so that the movement of any given individual is not reported within the anonymized analyzed data. It will be understood that separating the processing of the analysis of the video streams provides a first level of privacy-awareness. For example, and as described elsewhere herein, the video streams are not shared to a network location other than the secured location of the server 24. Similarly, the video streams are not directly made available to a party that is not controlled by, or does not have the same security credentials as, the party that is an administrator of the camera subsystem 8.

Figure 2:
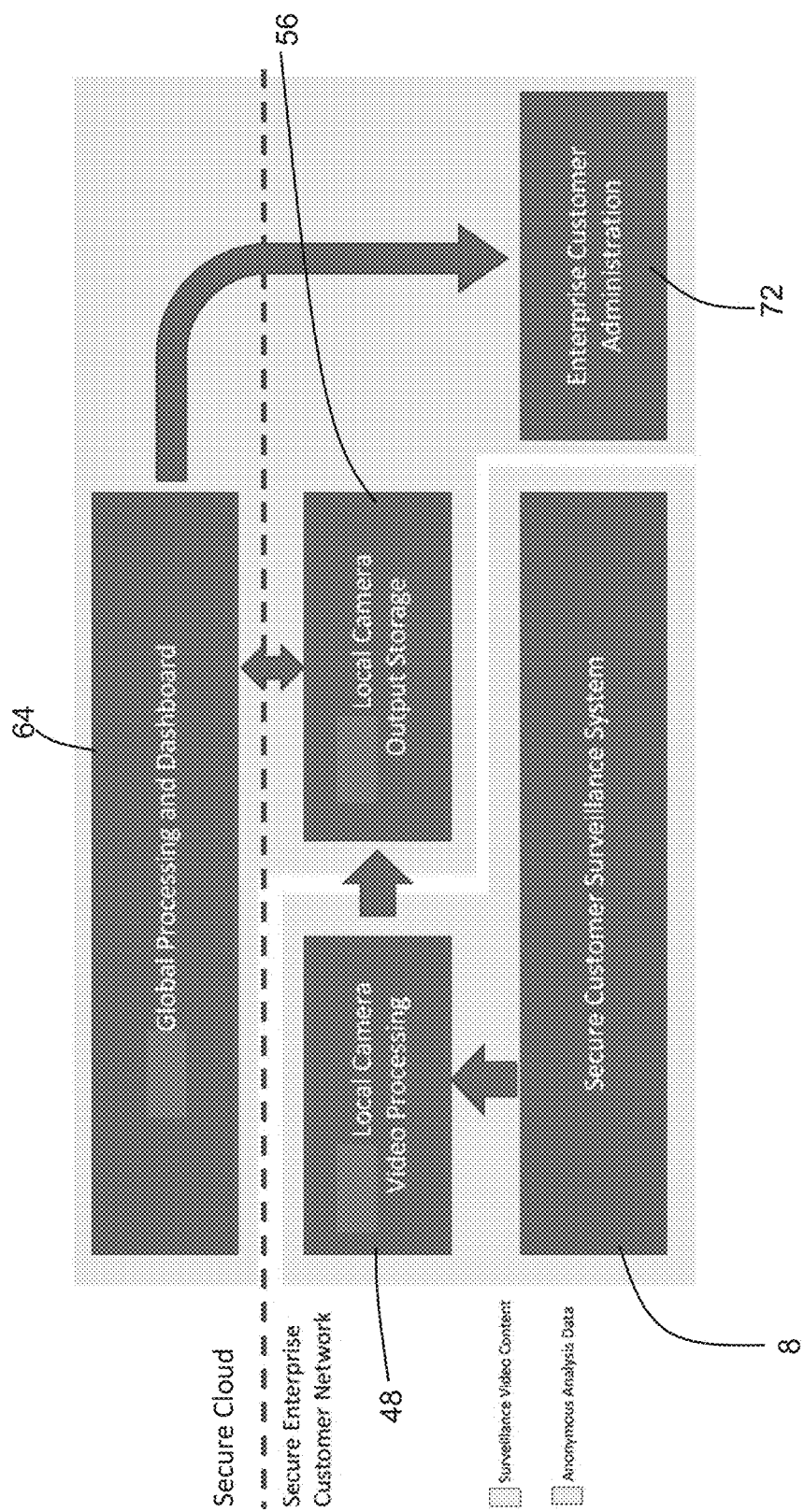
FIGS. 2 and 3 each illustrate a schematic diagram of various subsystems of the privacy-aware video stream analysis system according to an example embodiment.
Figure 3:
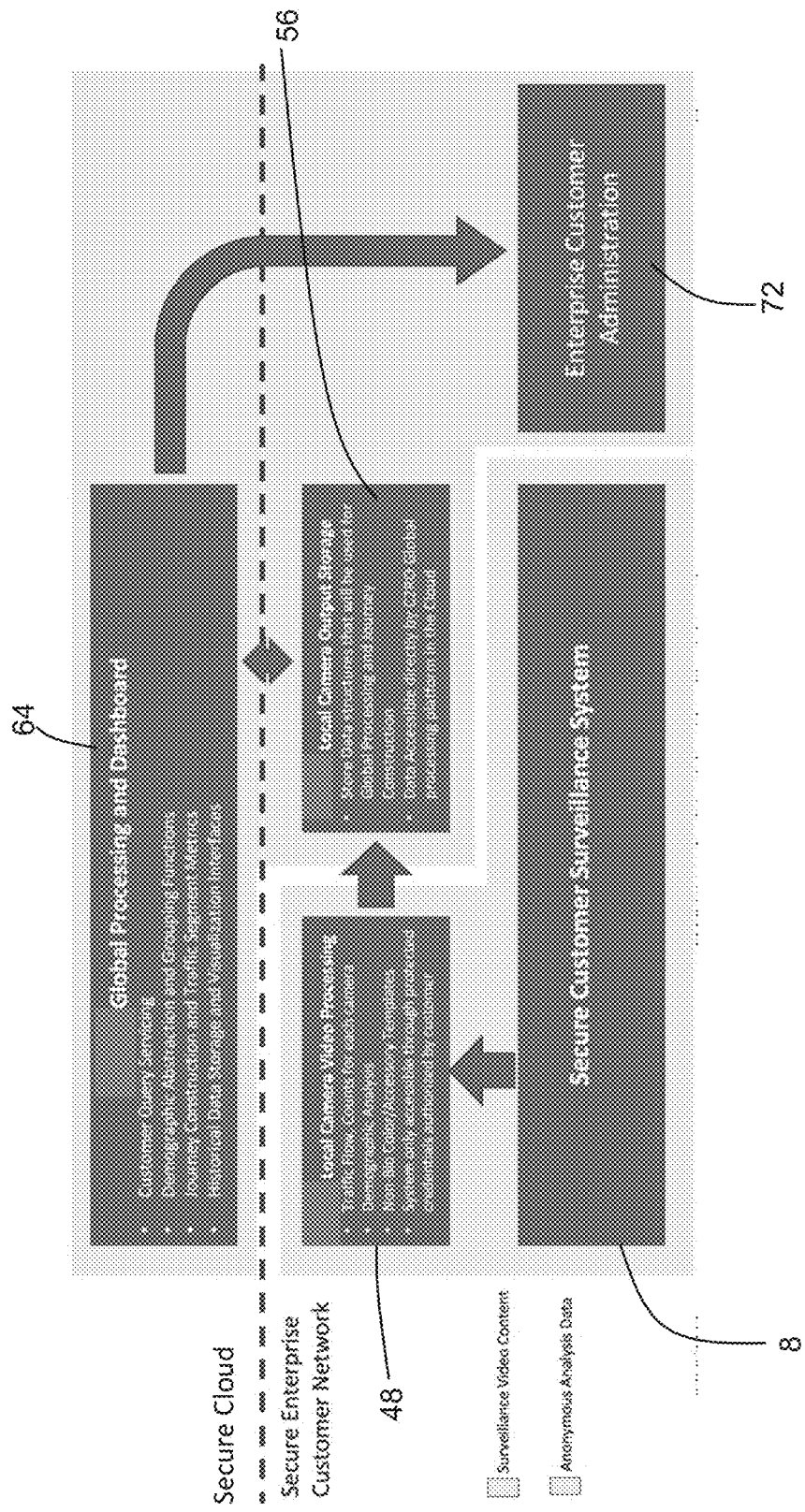

Referring now to FIGS. 2 and 3, therein illustrated is a schematic diagram showing the various subsystems of the privacy-aware video stream analysis system 1 having been segregated by network location and authorized access according to an example embodiment. According to this example embodiment, the privacy-aware tracking module 48 receives the video streams captured by the cameras 16 and carries out privacy-aware processing of captured images contained in the video streams.

In the illustrated example, the privacy-aware tracking module 48 is located at the same network location as the camera subsystem 8. For example, the camera subsystem 8 can be a surveillance camera subsystem. The privacy-aware tracking module 48 can be a hardware component connected to the server 24 and located at the same site as the server 24. Alternatively, the privacy-aware tracking module 48 can be installed as a software module within the server 24. In both cases, access to the privacy-aware tracking module 48 is restricted once it is deployed to prevent tampering or unauthorized access to the data processed module. Such access would otherwise be non-compliant with applicable privacy legislations, regulations and/or protocols. For example, once deployed, the privacy-aware tracking module 48 is administered by the same party that administers the surveillance camera system. It will be appreciated that access to privacy-sensitive data, such as the raw captured video streams, is restricted. Accordingly, the privacy-aware tracking module 48 is located at a secured network location.

Continuing with FIGS. 2 and 3, the anonymized intermediate track entries are outputted by the privacy-aware tracking module 48 and stored at the privacy-aware storage module 56. According to the illustrated example, the privacy-aware storage module 56 is located at a network location that is separate from that of the camera subsystem 8 and privacy-aware tracking module 48 (illustrated as being in different background shading representing different network locations). It will be understood that the network location being different can refer to access credentials to the privacy-aware storage module 56 being different from that of the privacy-aware tracking module 48, even though the two modules may be located at the same location or physical network. By separating access to the privacy-aware storage module 56, the anonymized intermediate track entries can be accessed by another module or another party without providing access to the raw video streams generated by the camera subsystem 8.

The anonymized intermediate track entries having the first level of granularity stored at the privacy-aware storage module 56 are made available to the traffic analysis module 64. The traffic analysis module 64 further receives the anonymized intermediate track entries, processes the track entries according to various analysis criteria, and outputs the anonymized traffic data. According to the illustrated example, the traffic analysis module 64 is located at a further network location that is distinct from that of the camera subsystem 8 and the privacy-aware tracking module 48. The traffic analysis module 64 can be administered by a party that is distinct from a party that administers the camera subsystem 8 and/or the privacy-aware tracking module 48. For example, various algorithms applied for the analysis of the anonymized track entries can be adjusted as required at the traffic analysis module 64 without affecting the privacy concerns applicable to the privacy-aware tracking module 48.

The anonymized traffic data outputted by the traffic analysis module 64 is made available to an external customer 72. For example, the anonymized traffic data can be prepared at the traffic analysis module 64 according to query criteria defined by the external customer 72. The anonymized traffic data allows the customer to obtain information about trends, such as foot traffic trends, in a privacy-aware manner. It will be appreciated that the external customer 72 receives the anonymized traffic data in a structured manner, such as according to the query criteria, without being provided access to the raw video streams or the anonymized intermediate track entries. That is, the track entries are not made available when the anonymized traffic data is made available. Accordingly, external customer 72 receives relevant traffic data while being compliant with applicable privacy legislations, protocols or regulations.

According to one example embodiment, the party receiving the classified anonymized traffic data can be the same as the party that operates the camera system 8 but that the users accessing the camera system 8 and the users receiving the classified anonymized traffic data have different privacy-related credentials. For example, security personnel of a shopping mall having higher security (or privacy-related credentials) can access the camera subsystem 8 and the raw video streams directly, which is required to ensure the security of the mall. For example, uniquely identifying a person may be required for ensuring security measures. Business-related personnel, such as marketing personnel, then receives the anonymized traffic data in a privacy-compliant manner. In the latter case, uniquely identifying persons would no longer be privacy-compliant.

Figure 4A:
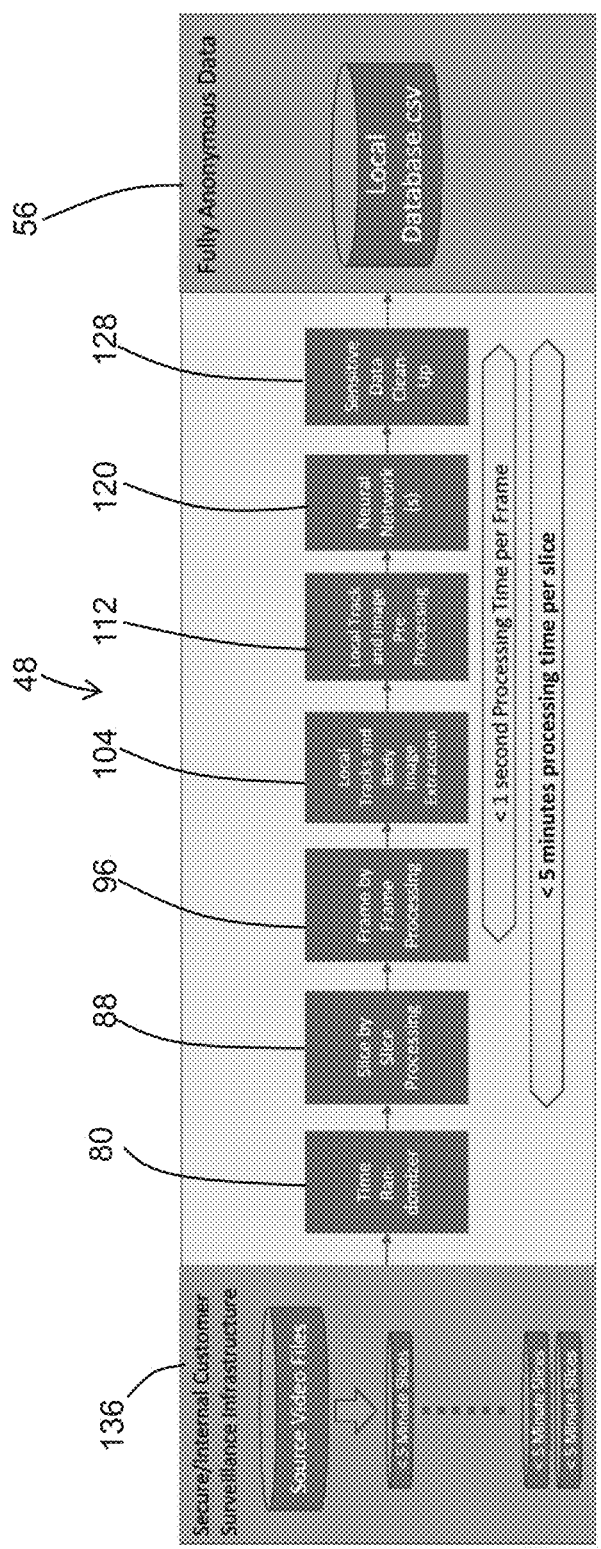
FIG. 4a illustrates a schematic diagram of the operational submodules of a privacy-aware tracking module according to an example embodiment.

Referring now to FIG. 4a, therein illustrated is a schematic diagram of the operational submodules of the privacy-aware tracking module 48 carrying out various privacy-aware processing functions according to one example embodiment. As described hereinabove, the privacy-aware classification module 48 operates on video streams received from the camera subsystem, and in particular the server 24 thereof. The privacy-aware classification module 48 outputs the anonymized intermediate track entries having the first level of granularity to the privacy-aware storage module 56. Generally, the privacy-aware tracking module 48 processes video streams that capture a plurality of unidentified persons, this processing determining, for each of the plurality of unidentified persons, a track entry that has a movement dataset and an anonymized characterizing feature set. The movement dataset indicates the movement of the person within a video stream and the anonymized characterizing feature set allows non-unique identification of the person in a localized setting.

The privacy-aware tracking module 48 according to the illustrated example embodiment includes a time randomizer submodule 80, a video slice processing submodule 88, a frame processing submodule 96, a person extraction submodule 104, a pre-processing submodule 112, a characteristics extraction submodule 120 and a data clean-up module 128. It will be understood that the privacy-aware tracking module 48 illustrated according to FIG. 4a includes a plurality of privacy-aware analysis functions and submodules, but that in other example embodiments, only a subset of one or more of these functions and submodules may be implemented.

The time randomizer submodule 80 is configured to randomize the timing of the content found in the video streams when being analyzed. It will be appreciated that in some circumstances, it is possible to obtain personalized data regarding a person captured in a video stream or to uniquely identify that person based on timing information. This can be the case even if the uniquely identifying features of the person captured in the video stream are not processed. For example, timing information can be correlated with external information (ex: point of sales data, access to location data, etc.) in order to uniquely identify that person if the external information contains unique identifiers (ex: a credit card, an access keycard, etc). In a more detailed example, if a video stream showing a given person making a payment at a cash register is correlated with point sales data, by matching the time stamp on the video stream with the time stamp of that sale, it is possible to obtain the unique identity of that person. Subsequent tracking of that person in various video streams after having obtained the unique identity of that person may then represent the generation of individualized information in a manner that is not compliant with privacy-related legislations, protocols or regulations. It will be further appreciated that randomizing the time of a video stream being analyzed would restrict or prevent the ability to uniquely identify the person based on timing information.

Figure 4B:
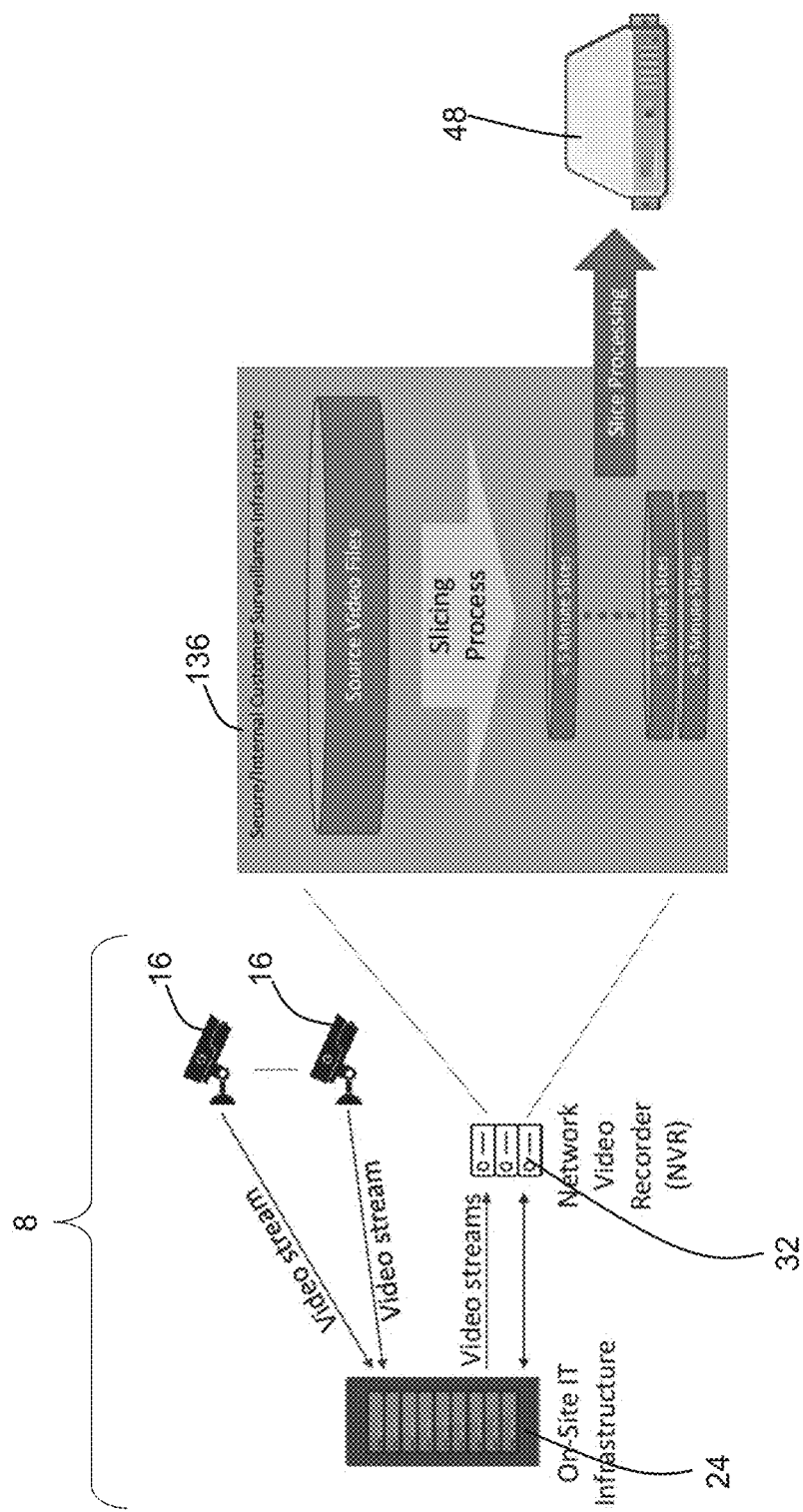
FIG. 4b illustrates a schematic diagram showing the retrieval of a video stream by the privacy-aware tracking module from a server of a camera subsystem according to one example embodiment.
Figure 4C:
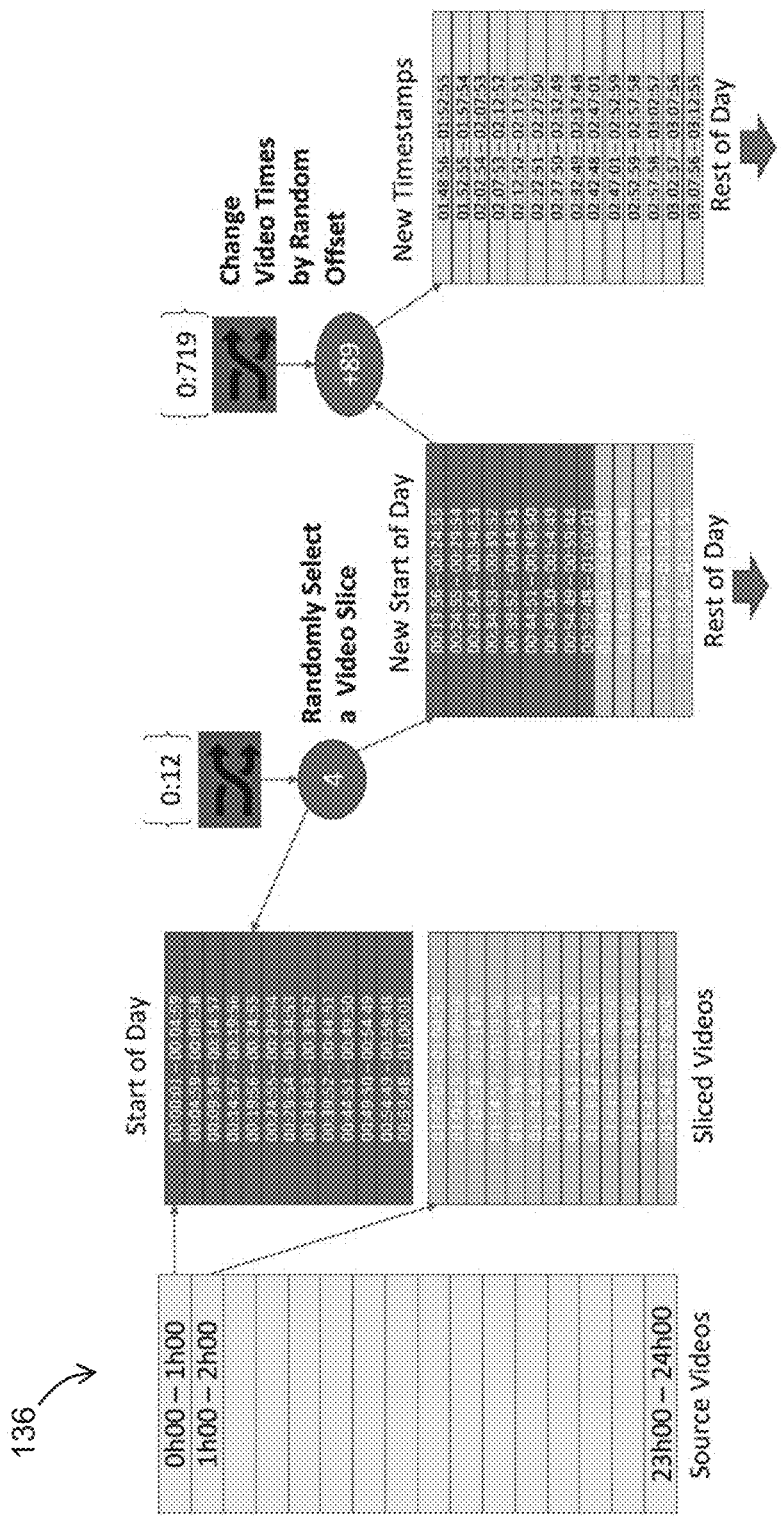
FIG. 4c illustrates a schematic diagram showing the randomizing of timing information in a video stream according to one example embodiment.

As illustrated in FIGS. 4a, 4b and 4c, the video streams 136 are stored within the camera subsystem 8 and typically within the network video recorders 32. The video stream 136 stored for each camera 16 may be divided into a plurality of video slices. Alternatively, the video stream 136 can be divided into the plurality of video slices when being received by the privacy-aware tracking module 48. The slicing of the video streams serves a first purpose of partly permitting the time randomizing. The slicing of the video streams can also serve the purpose of being compliant with particular privacy-related legislation, protocols or regulations that limit the amount of time raw video information can be held by certain users, such as users with lower security clearance. For example, a slice can have a duration that is less than a threshold duration. This threshold duration can be legislatively defined (i.e. defined by the privacy-related legislation, protocol or regulation). Furthermore, by processing the slice as soon it is received in a real-time manner or faster and then discarding the slice immediately upon completion of the processing of the slice, the retention limits will be complied with.

FIG. 4c is a schematic diagram showing various aspects of the time randomizing carried out by the privacy-aware traffic module 48. FIG. 4c shows the randomizing applied to the first time interval of the video stream. In the illustrated example, the first time interval corresponds to one day. Subsequent time intervals will then correspond to subsequent days. The video stream is generated from a single given camera, but it will be understood that the time randomizing can be applied to each of the video streams from the camera subsystem 8.

As described hereinabove, the video stream is divided into a plurality of video slices. Furthermore, each video slice can have a time length that is less than a threshold duration. The threshold duration can be selected according to applicable privacy-related legislation, regulation or protocol that defines the amount of time a video stream can be retained for non-security related purposes. In the illustrated example, the threshold duration is set at less than 5 minutes (ex: 4 minutes and 59 seconds). Furthermore, slices of the first two hours of the video stream for the day are illustrated.

A first processing start time is randomly determined. This random processing start time defines a starting point within the video stream from which processing of the video stream will begin. More particularly, any video stream that precedes the randomly determined starting point within the time interval of the video stream is discarded and is not further processed. Furthermore, the starting point for each time interval (ex: for a second day, a third day, and so forth) are determined randomly independently of the first processing start time and independently of one another. Accordingly, the processing start time for each different time interval (ex: each different day) is unrelated.

It will be appreciated that randomly selecting a processing start time for each time interval of the video stream provides a first level of privacy-awareness in that it becomes no longer possible to track back to the beginning of a time interval. This would otherwise have been a workaround where a time stamp is not available or has been altered, as described elsewhere herein.

According to one example, and as illustrated, the first processing start time is randomly determined from within a first sub-interval of the time interval. This first sub-interval can correspond to the first hour of the first time interval.

According to one example, and as illustrated, randomly determining a first processing start time comprises randomly selecting a starting video slice from the plurality of video slices. Therefore, video slices preceding the starting video slice are discarded and video slices subsequent to the starting video slices are processed. The starting video slice can be randomly selected from the first sub-interval of the time interval. In the illustrated example, the 4th video slice (corresponding to start time 00:19:56; the first slice being slice 0) is randomly selected as the starting video slice.

In addition to randomly determining a processing start time for each video stream, the privacy-aware tracking module 48 is further configured to adjust the time stamps of the video stream. More particularly, for a given video stream, for each video slice of a given time interval subsequent to the randomly determined processing start time for that time interval, the time stamp of the video slice is adjusted by a random time offset. This time offset is particular to the given time interval. That is, the time offset for the time interval is determined randomly independently of the time offset for other time intervals (ex: for a second day, a third day, and so forth).

In the illustrated example of FIG. 4c, the time offset is randomly determined to be +89 minutes. Accordingly, the first slice after the processing start time which originally had a 00:19:56 time stamp has been changed to a time stamp of 01:48:56.

It will be appreciated that randomly applying a time offset to the time stamps of the video slice provides a second level of privacy-awareness in that it becomes no longer possible to determine the real-world time of any information (ex: any frame) of a video stream simply by looking at the time stamp. Furthermore, in combination with the first aspect of randomly selecting a processing start time, the ability to determine the real-world time for any information of a video stream becomes more restricted or entirely prevented.

Where a camera subsystem 8 includes a plurality of cameras each outputting a respective video stream and the plurality of cameras have respective fields of view covering a same physical space, the same randomly determined processing start time is applied for each of the video streams for a given time interval and the time stamps of each of the slices of the video streams for the given time interval is adjusted by the same randomly determined time offset. Choosing the same randomly determined processing start time and the same time offset for each of the video streams for a given time interval ensures that the time stamps of the video streams remain aligned in time. Accordingly, a video slice of any one of the video streams having a given time-stamp and another video slice of another one of the video streams having the same time stamp will have a real-world correspondence in time. In other words, actions captured in the video slice of the first stream and actions captured in the video slice of the other stream occurred at the same time in the real-world if the time stamps in both video streams are the same.

Further processing of the video streams can be carried out by the privacy-aware tracking module 48 applied to the video slices having the adjusted time stamps.

For further clarity, it will be understood that the same processing start time and same time offset are randomly determined for each of one or more video streams for a same time interval (ex: a same day). For a subsequent (ex: second) time interval of the one or more video streams, another (ex: second) processing start time is randomly determined independently of the start times of any other time interval and another (ex: second) time offset is determined independently of the time offsets of any other time interval. The other processing start time and the other time offset is applied to the slices of the one or more video streams of the other time interval in the same manner as described herein for the give time interval as described above.

Referring now to FIG. 4d, therein illustrated is a schematic diagram showing the operational steps of a method 140 for privacy-aware processing of a set of at least one video stream according to one example embodiment.

At step 144, the one or video streams from a camera subsystem 8 for a given time interval for processing (ex: privacy-aware classification) are received. As described herein, the video streams may already be divided into a plurality of video slices each having a duration less than a threshold duration. Alternatively, the video streams may be broken down into the slices at the time of receiving the video streams.

At step 152, a processing start time for the given time interval is randomly determined. The same start time will be applicable for each video stream for that given time interval.

At step 160, a time offset is randomly determined. The same time offset will be applicable for each video stream for that given time interval.

At step 168, for each video slice for each of the one or more video streams, the time stamp of the video slice is adjusted by the randomly determined time offset. This adjustment is applied to all video slices that are subsequent to the randomly determined processing start time.

At step 176, the video streams of the given time interval having the adjusted time stamps are further processed. This processing can include privacy-aware analysis according to various methods described herein.

Referring back to FIG. 4a, the privacy-aware classification module includes both an aspect of slice-by-slice processing 88 and an aspect of frame-by-frame processing 96. As described elsewhere herein, the slice-by-slice processing 88 is applied for generating information over time, such as tracking movement of a person over a space corresponding to a field of view of a given camera. The frame-by-frame processing 96 is applied for instances of more computational-intensive tasks, such as characterizing or classifying a person within a frame of a video stream.

As is known in the art, the video stream for a given camera contains a series of images of a field of view associated with that camera. One or more persons can be captured within the series of images as they move about a space corresponding to the field of view. Within the series of images forming the raw video stream, the persons are unidentified in that further processing has not yet been applied to determine the unique identity of these persons.

According to various example embodiments described herein, each video stream can be processed to track the movement of persons captured within the video stream in a privacy-aware manner. The tracked movement can be outputted as a movement dataset within one or more track entries, which may be anonymized track entries.

According to one example embodiment, and as illustrated in FIG. 4a, the person extraction submodule 104 is configured to detect, within the series of images of a field of view for a given camera, an unidentified person captured within the series of images. This can include detecting a body region that corresponds to the unidentified person. The body region may be detected according to body detection techniques known in the art. For example, a body detection algorithm can be applied on a given frame (one image) of the video stream to make an initial detection of the body region and a tracker process can be applied to subsequent frames (subsequent images within the series) to continue tracking of the detected body region.

The movement of the unidentified person over the field of view can be tracked within the first series of images to generate a first movement dataset. The tracking of the body region can be used to track the movement of the person over the physical space corresponding to the field of view as captured within the series of images. The tracked movement of the body is further used to generate the movement dataset for that person describing the tracked movement. It will be appreciated that the movement dataset by itself is not sufficient to uniquely identify the person. For example, the movement tracking (ex: by the processing for applying body region detection and tracking) does not include processing to extract features of the unidentified person (ex: from within the body region), such as biometric features, that would allow for uniquely identifying the person. More particularly, the movement tracking (ex: by the body region detection and tracking) are free of (i.e. does not) applying unique identification of the person based on biometric information, whether physical, physiological and/or behavioral. For example, the body region detection and tracking are free of applying unique identification of the person based on physical biometric information that includes one or more of, but not limited to, visual features in the image such as face, gait, silhouette and/or retina/iris. For example, the body region detection and tracking are free of applying unique identification of the person based on physiological biometric information that includes one or more of, but not limited to, heartbeat, voice, etc. For example, the body region detection and tracking are free of applying unique identification of the person based on behavioral biometric information that includes one or more of, but not limited to, gait.

Continuing with FIG. 4a, a pre-processing submodule 112 is configured to apply a set of pre-processing steps to the series of images prior to further processing by the characterizing extraction submodule 120. The pre-processing and the further processing can be applied to a subset of the series of images, such as being applied intermittently, whereby some images are not processed at all. The pre-processing submodule 112 can be applied only to the detected body regions of the series of images, as detected by the person extraction submodule 104.

In particular, the pre-processing submodule 112 is configured to anonymize a given image of the series by applying at least one removal of identifying features from that given image of the series (or from the detected body region of that image). The removal of identifying features can be irreversible, such that once the features are removed from a given image, they cannot be added back to that image in some way. The removal of the identifying features may include the removal of at least one uniquely identifying biometric information from the given image (or from the detected body region of that image). This removal may include the removal of visible features. Accordingly, the pre-processing submodule 112 outputs an anonymized image and/or an anonymized body region of the image for further processing.

In one example embodiment, any and all features that would be required to uniquely identify the person are removed by the pre-processing submodule 112. Accordingly, only non-biometric information would remain within the pre-processed image when outputted by the pre-processing submodule 112. Accordingly, the pre-processed image (or the pre-processed detected body region) would not be sufficient by itself to permit uniquely identifying the person within the image.

The characteristics extraction module 120 receives at least one image of series of images of the unidentified person and is further configured to process the at least one image to determine a characterizing feature set for the unidentified person. The characteristics extraction submodule 120 may receive the anonymized image (or the anonymized detected body region) from the pre-processing submodule 112 and is further configured to process the anonymized image (or detected body region) to determine an anonymized characterizing feature set for the person based on the processing. This characterizing feature set, which may be anonymized, does not include any biometric data that uniquely identifies the person captured in the series of images. For example, where all features that would be required to uniquely identify the person are removed by the pre-processing submodule 104, the anonymized characterizing feature set could not possibly include any biometric data that uniquely identifies the person. Moreover, the determination of the anonymized characterizing feature set is also free of applying any unique identification of the person based on biometric information, whether physical (ex: visual features in the image such as the face, silhouette, retina/iris, etc.), physiological (ex: heartbeat, voice, etc.) and/or behavioral (ex: gait, etc.).

Figure 5A:
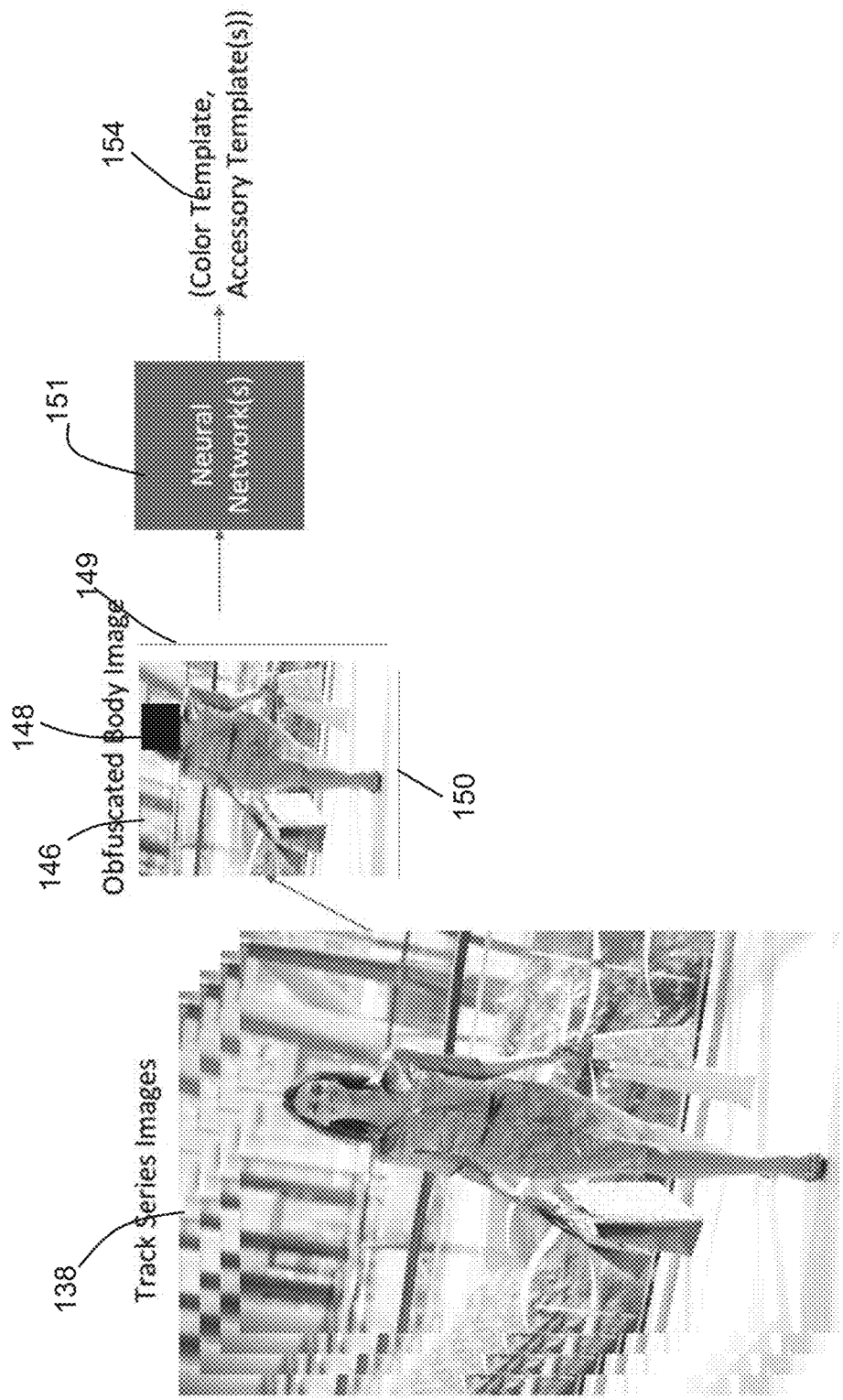
FIG. 5a illustrates a schematic diagram graphically showing the processing steps applied to a series of images by the pre-processing submodule and characteristics extraction submodule according to one example embodiment.

Referring to FIG. 5a, therein illustrated is a schematic diagram graphically showing the processing steps applied to a series of images by the pre-processing submodule 112 and the characteristics extraction submodule 120 for generating the anonymized characterizing feature set according to one example embodiment. A series of images 138 of an unidentified person is received. For example, the body region detection and the tracking has been applied such that the series of images comprises only the body region of the person, which is the case in the example illustrated in FIG. 5a. During the body region detection and tracking, if a body region is not detected within any given image of the series, that image is discarded outright and is not used for further processing, such as for the extraction of the anonymized characterizing feature set. This ensures that uniquely identifying biometric information is not made available for further processing.

A given image of the series of images is selected for further processing. As described elsewhere herein, at least one removal of identifying features within the image or the body region is applied. This removal can include the removal of one or more uniquely identifying biometric features.

According to an example embodiment and as illustrated in FIG. 5a, the at least one removal of identifying features includes masking a face subregion 146 of the body region, whereby the face and facial features are removed. It will be appreciated that this results in the face and the facial features no longer being available as uniquely identifying biometric features for further processing. The masking of the face subregion 146 can be carried out by detecting the face subregion within the image or the body region of the image. The mask is then applied to that face sub-region. In the illustrated example, the face sub-region is replaced by a black box (ex: adjusting the pixel value of each pixel within the face sub-region to a same value, such as pixel value '0'). This masking can be an irreversible step. In other example embodiments, a top portion of the image containing the face sub-region is cropped out of the image.

According to an example embodiment, and as illustrated in FIG. 5a, at least one removal of identifying features includes distorting the body region. It will be appreciated that this results in the silhouette of the person being removed as a uniquely identifying biometric feature that would otherwise be available for further processing. The distorting of the body region can be carried out by randomly changing the aspect ratio of the body region of the person. This has the effect of changing the visual appearance of the height 149 and width 150 of the person within the distorted the body region. This represents another anonymizing aspect since the visual appearance of the height and width would no longer match the real-world silhouette of the person, thereby preventing identification based on this biometric feature.

For each given image of the series of images 138, the random aspect ratio by which the body region is distorted within the given image can be determined independently. Accordingly, from one image to another of the series 138 the aspect ratio of the body regions will be variable once distorted, which further restricts the ability of the neural network to extract silhouette information from the images.

The distorting of the body region can be carried out in combination with the masking of the face subregion. In the illustrated example, the anonymized body region image 148 has both a masked face region 146 and a distorted silhouette.

The anonymized body region image 148 is further processed to extract an anonymized characterizing feature set. This processing can be carried out by a trained neural network 151, which may be implemented within the characteristics extraction submodule 120. As described elsewhere herein, the removal of the uniquely identifying features to generate the anonymized body region prevents the characteristics extraction submodule 120 from generating data that uniquely identifies the person. For example, facial recognition or silhouette analysis to identify the person are not available because this information has been removed within the anonymized body region. Accordingly, the anonymized characterizing feature set is generated based on the remaining non-biometric information contained in the anonymized body region.

According to one example embodiment, the anonymized characterizing feature set includes a characterizing color pattern and accessory elements extracted from the anonymized body region. These elements can be extracted from clothing information (ex: top, bottom, shoes, hat, etc.) and/or accessory information (ex: handbag, jewelry, etc.) found in the anonymized body region.

It will be appreciated that this information is insufficient for determining the unique identify of the person. For example, two different people can own the same coat, handbag or shoes. However, this information can be useful for distinguishing the person in a localized context (ex: temporally and geographically). For example, within a localized time interval and/or space, there is a low likelihood that another person will have the same combination of clothing and accessories.

Where a neural network is applied to generate the anonymized characterizing feature set, the neural network can be trained using supervised training. Furthermore, a training set formed of a plurality of anonymized body region images can be used to train the neural network. The training set can include images of the same person wearing the same clothes and accessories but having been distorted to different aspect ratios, wherein these images are annotated to represent a match. Having differently distorted image being annotated to represent a match causes the neural network to learn matches despite the distorting of aspect ratios of the body region. Accordingly, anonymized characterizing feature sets can be generated by the neural network with lesser or no consideration for the aspect ratio.

The movement dataset and the anonymized characterizing feature set (ex: the color pattern and accessory elements) for a given body region are associated together. The associated movement dataset and the anonymized characterizing feature sets can be stored in a logically linked or logically associated manner within the privacy-aware storage submodule 56. Each associated movement dataset and anonymized characterizing feature set forms a track entry. It will be appreciated that the track entry contains obfuscated data in that this data is insufficient to permit unique identification of the real-world person whose movement was initially captured and used to generate the track entry. The movement dataset is obfuscated since it merely indicates the movement of the body region of a captured person over a physical space, which by itself is insufficient to uniquely identify the person. The anonymized characterizing feature set is generated from images that have the removal of identifying features applied to them, and therefore the set is also insufficient to permit the unique identification of the person.

Figure 6:
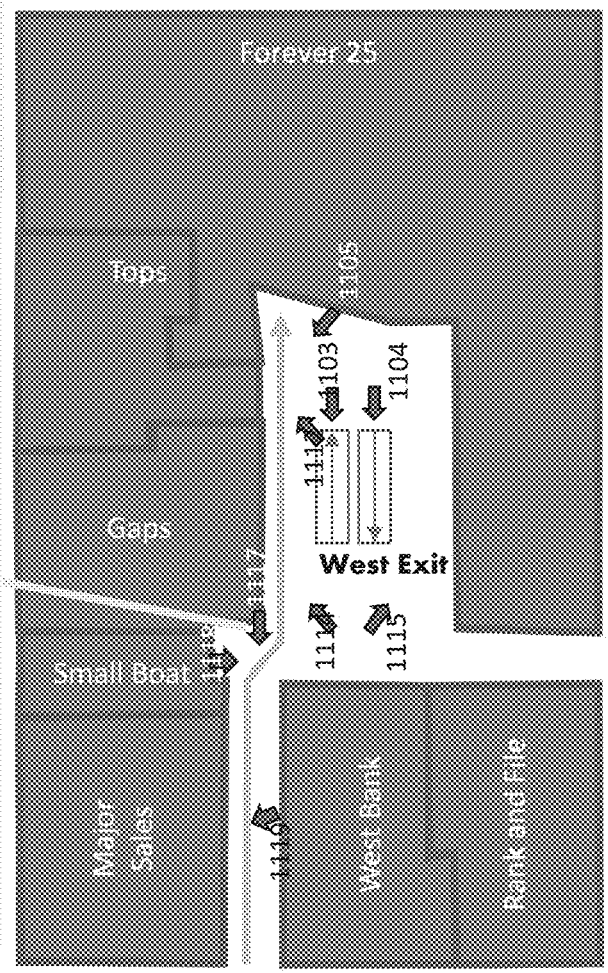
FIG. 6 illustrates a schematic diagram showing stored track entries according to one example embodiment.

Referring now to FIG. 6, therein illustrated is a schematic diagram showing stored tracks entries formed of movement datasets and anonymized characterizing feature sets according to one example embodiment. The illustrated stored track entries are generated from a single video stream (i.e. one camera). It can be seen that each track entry includes a time stamp, first frame entry, last frame entry, speed and dwell time. These entries together form the movement dataset that describes the time at which a person corresponding to a detected body region was present within the field of view, how long the person was present, the speed of the movement and whether the person dwelled in one location during the movement. Each track entry also includes the anonymized characterizing feature set stored in the form of a color/accessory vector.

Figure 5B:
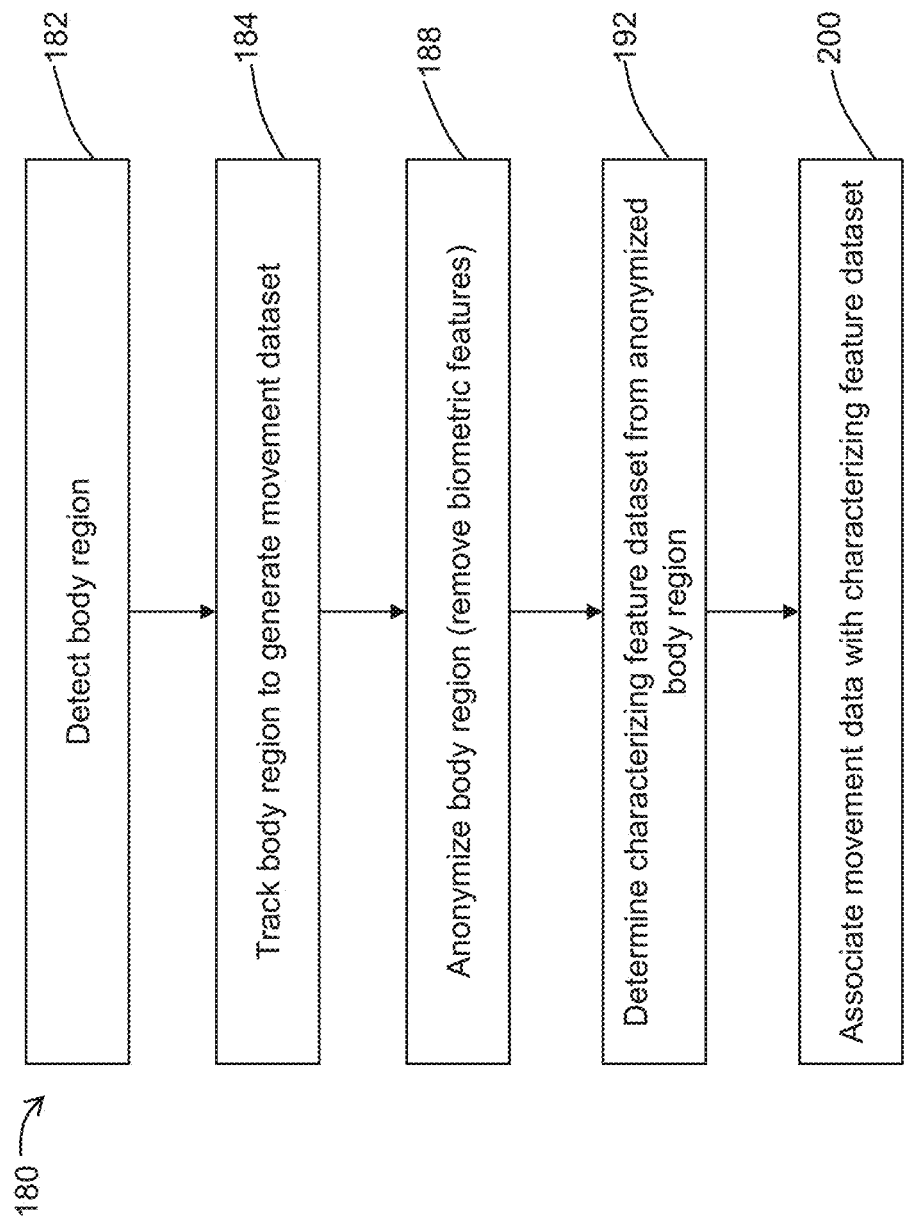
FIG. 5b illustrates a schematic diagram showing the operational steps of a method for privacy-aware movement tracking according to one example embodiment.

Referring now to FIG. 5b, therein illustrated is a schematic diagram showing the operational steps of a method 180 for privacy-aware movement tracking according to one example embodiment. The method may be carried out by the person extraction submodule 104, pre-processing submodule 112 and characteristics extraction submodule 120 of the privacy-aware tracking module 48.

After receiving the series of images of the first field of view, at step 182, a body region of an unidentified person captured within the series of images is detected.

At step 184, the movement of the body region over the field of view is tracked to generate a movement dataset.

At step 188, the detected body region is anonymized by removing at least one identifying feature. The removal can be applied to at least one image of the body region. As described elsewhere herein, the removal can include masking a face subregion and randomly distorting the silhouette.

At step 192, an anonymized characterizing feature set is determined from the processing of the anonymized body region.

At step 200, the movement dataset and the anonymized characterizing feature set are associated to form a track entry.

The description provided hereinabove pertains to generating a single track entry for a single instance of detecting a body region, which represents a single instance of one person being present within the field of view. It will be understood that a track can be generated for each instance of a body region being detected within the series of images of a video stream. Furthermore, two or more tracks can be generated at the same time within the series of images (ex: detecting two or more body regions for two or more people being captured at the same time within the series of images).

It will be further understood that the generating of tracks is also repeated for each video stream generated by each camera 16 of a camera subsystem 8. For example, for the second series of images for the second field of view corresponding to a second camera, a second unidentified person can be detected (such as being detecting the second body region for the second unidentified person). The movement of the second unidentified person can also be tracked (ex: by tracking the second body region) to generate a second movement dataset for the second unidentified person. Furthermore, for a least one image of the second series, the second body region may also be anonymized by applying at least one removal of identifying features. This removal can include masking a face subregion of the second detected body region and/or randomly distorting the second detected body region. An characterizing feature set (which may be an anonymized characterizing feature) is further generated for the second person based on the processing of the second anonymized body region. The generated movement dataset and the characterizing feature set for the second person can also be associated to form a second track entry. Repeating this process for all detections of the unidentified persons (ex: body regions of the unidentified persons) within the second series of images for the second camera generates other series of tracks for this camera in the same manner as illustrated in FIG. 6.

According to various example embodiments, the processing of a respective video stream to generate the movement dataset and the characterizing feature set for a captured person can be carried out substantially in real-time, i.e. at the moment that the video stream is being captured. Accordingly, the video stream does not need to be stored by the privacy-aware tracking module 48. According to such embodiments enable to carry out real-time privacy-aware tracking, the privacy-aware tracking module 48 can be free of, i.e. does not include, the time randomizer submodule 80. Since the time randomizer submodule 80 serves to randomize the timing when video is stored, it can be omitted where the processing of the video stream is carried out substantially in real-time and the video stream itself is not stored.

Accordingly, for a camera system 8 having a plurality of cameras 16 that each output a respective video stream, the privacy-aware processing of the video streams from each of the cameras output a respective set of track entries for each camera. The set of track entries for a given camera corresponds to each instance of detection and tracking of a captured unidentified person in the manner described hereinabove. This results in a plurality of sets of tracks being stored within the privacy-aware storage module 56, each set corresponding to one camera. It will be appreciated that when the sets of track entries are stored at this stage, the data in any set of track entries have not yet been associated or linked with the data of any other set of track entries.

The set of track entries for any one camera and the set of track entries for any other camera are linked by at least two factors. A first factor is the physical characteristics of the fields of view of the cameras. In one situation, if the fields of view of the cameras overlap, then it is possible for the same person to appear in the fields of view of both cameras at the same time. Accordingly, a given track entry in the set for the first camera and a second given track entry in the set for the second camera where both track entries have overlapping time stamps can correspond to the same real-world person being represented in these two track entries from different sets.

In a second situation, if the fields of view of the cameras are located close to one another, but do not overlap, a first track entry in the set of track entries for the first camera and a second track entry in the set of track entries for the second camera can represent the same real-world person if the two track entries occurred with a short time of one another (i.e. the first and second track entries have respective time stamps that are close to one another). Track entries that have time-stamps that are too far apart (ex: above a certain time gap threshold) cannot possibly represent the same real-world person.

Similarly, the set of track entries for a given camera for a given time and the set track entries for the same camera for another given time period can also be linked by a similar factor. A first track entry for the camera and the second track entry for the same camera can represent the same person if the two track entries occurred with a short time of one another (i.e. the first and second track entries have respective time stamps that are close to one another). Track entries that have time-stamps that are too far apart (ex: above a certain time gap threshold) cannot possibly represent the same real-world person. Furthermore, track entries that have overlapping time-stamps within the same field of view cannot be the same real-world person.

The physical characteristics of the fields of view of the cameras 16 within a unified camera subsystem 8 can be represented by a set of constraint rules that define permitted linking of pair of track entries. In particular, the set of constraint rules are applied to ensure that a single real-world person is not interpreted as being two or more separate persons when analyzing the tracks (tracks remain unlinked when they represent the same person). Similarly, the set of constraint rules are applied to ensure that two different real-world persons are not interpreted as being the same person (linking two tracks that should not be linked).

According to various example embodiments, the following set of constraints can be defined:
  a maximum permissible time gap threshold: if the difference in time gaps for two tracks exceed this permissible time gap threshold, the tracks cannot be linked;
  tagged track entries (a track can be tagged when it crosses an areal threshold or is measured to have triggered an analysis point, ex: a dwell time threshold is exceeded, or a track crosses into a specific area of a field of view—this tagging is useful for linking pair of track entries and for other data
  permissible edges/paths between two cameras are defined: only pairs of track entries that belong to these permissible edges/paths can be linked;
  permissible edges/paths between two cameras are defined: only pairs of track entries that belong to these permissible edges/paths and that have the permissible direction can be linked;
  same time and same camera are not allowed: two tracks that occur at the same time on the same camera are not allowed, otherwise, this would represent two people existing in two places at the same time;
  same time, different camera is sometimes allowed: two tracks occurring at the same time on two different cameras are not allowed if the fields of view of those cameras do not overlap (the amount of overlap—complete overlap, partial overlap, or no overlap—can also be defined to further fine-tune this constraint);
  sequential time, same space: two tracks that occur sequentially cannot be linked if the fields of view of the two cameras fully overlap—in such situations, the tracks must occur at the same time;
  upper and lower speed thresholds—a detected body region cannot move slower than the lower speed threshold (ex: 0.00278 meters/second), nor faster than the upper-speed threshold (ex: 1.946 meters/second);
  wormhole: a person cannot reappear on the same camera without having appeared on any other camera.

The constraints can be defined by a graph network, wherein each node of the graph corresponds to a camera/video stream and the edges of the nodes define the applicable constraints between each node pair. For example, each edge defines conditions that permit the connection of two tracks belonging to those nodes, whereas the lack of an edge between two nodes indicates that the two tracks cannot be connected. Some edges can further have a directional characteristic to define the permitted direction along that edge.

Figure 7A:
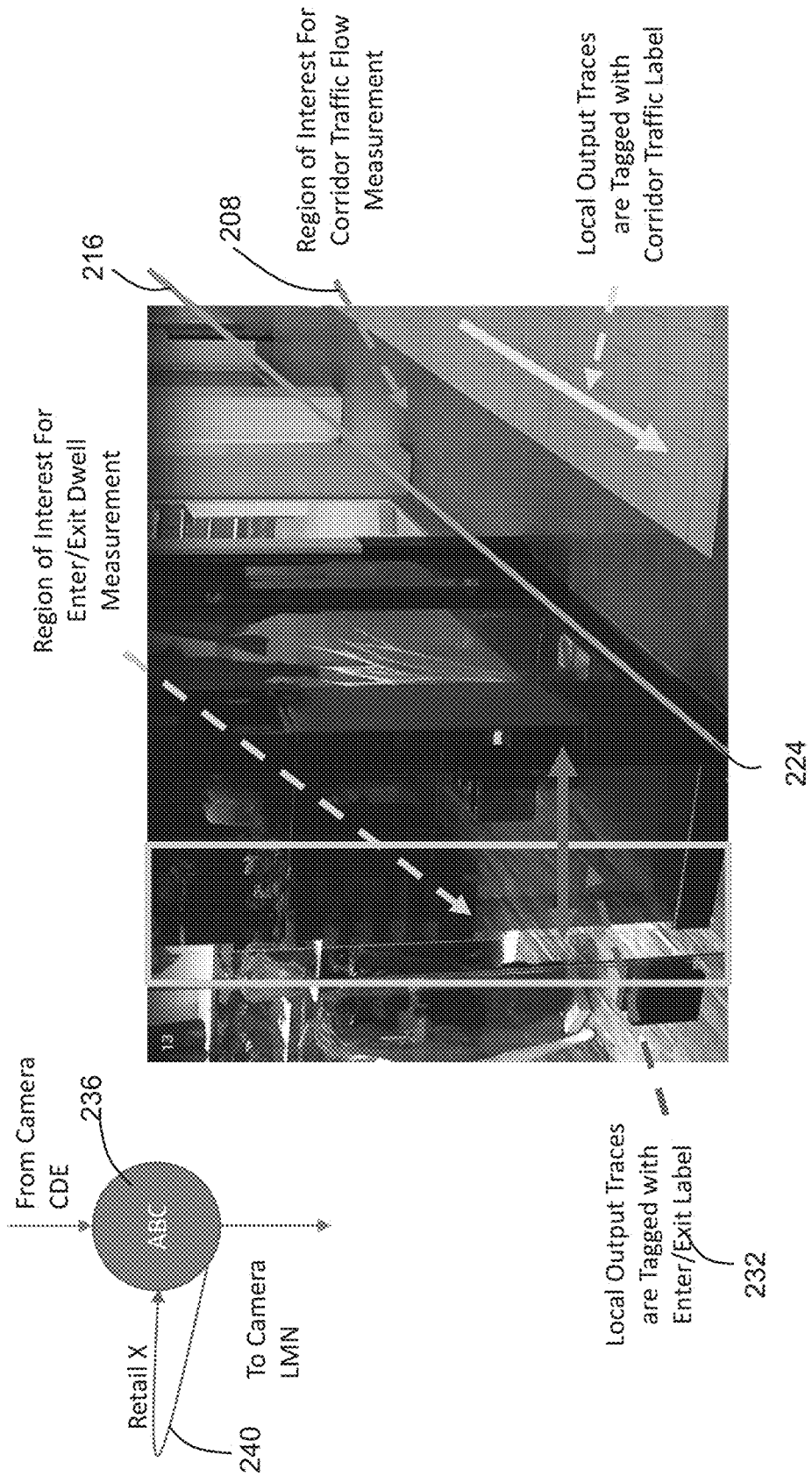
FIG. 7a illustrates an exemplary field of view of a camera and actions that a person can take within the space covered by the field of view.

Referring now to FIG. 7a, therein illustrated is an exemplary field of view of a camera and actions that a person can take within the space covered by the field of view. These actions define edge connections to other cameras (nodes). For example, the field of view includes a corridor 208 (which allows a travel speed along the corridor), top exit 216, bottom exit 224, and entrance/exit 232 to retail X. The field of view is represented by node ABC 236, the top exit 216 is represented by the edge to Camera CDE and the bottom exit 224 is represented by the edge to Camera LMN. For the retail X, a person must exit from the field of view into retail X before reentering the field of view from retail X. This is represented by the curved directional edge 240 in the graph network. The amount of time between the exit to retail X and the reenter from retail X can be determined as dwell time.

Figure 7B:
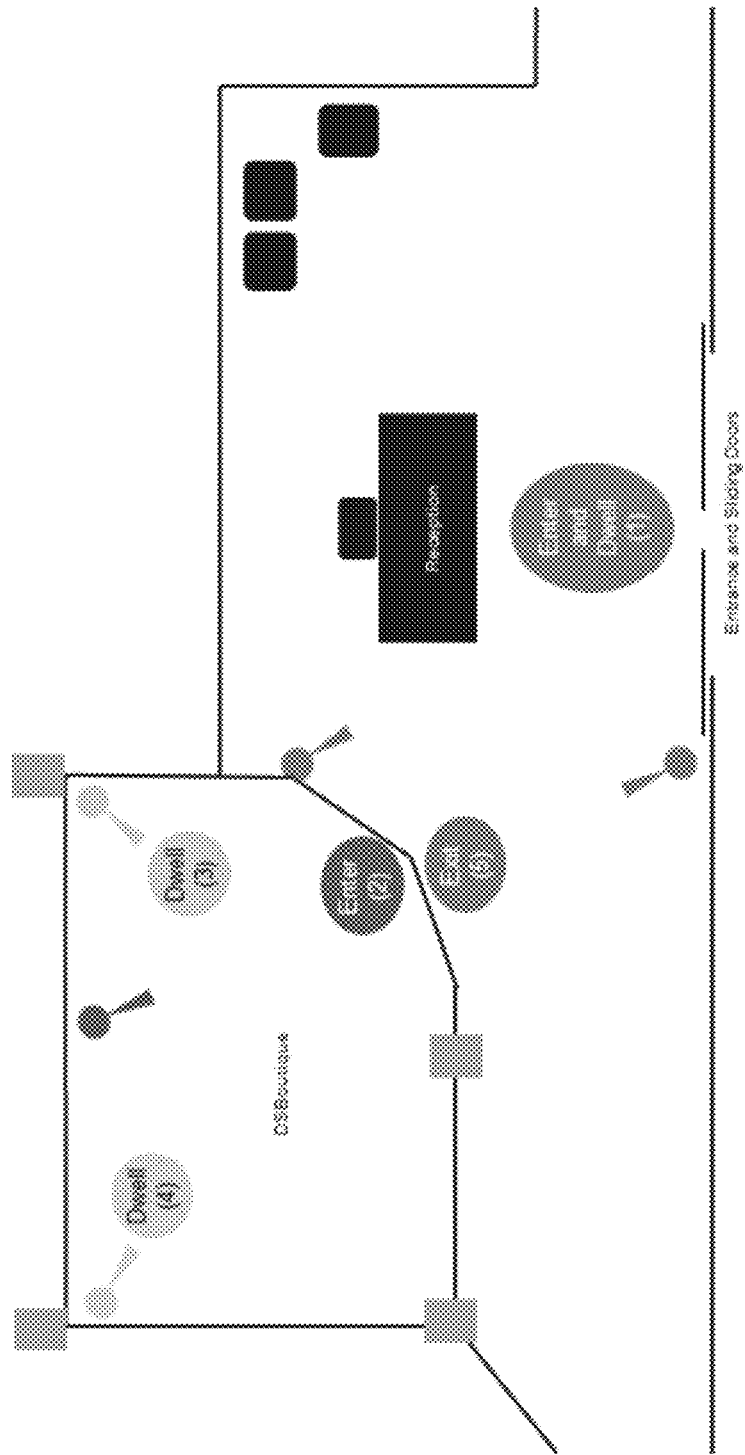
FIG. 7b illustrates a representation of a simple monitored space and its fields of view according to an example embodiment.
Figure 7C:
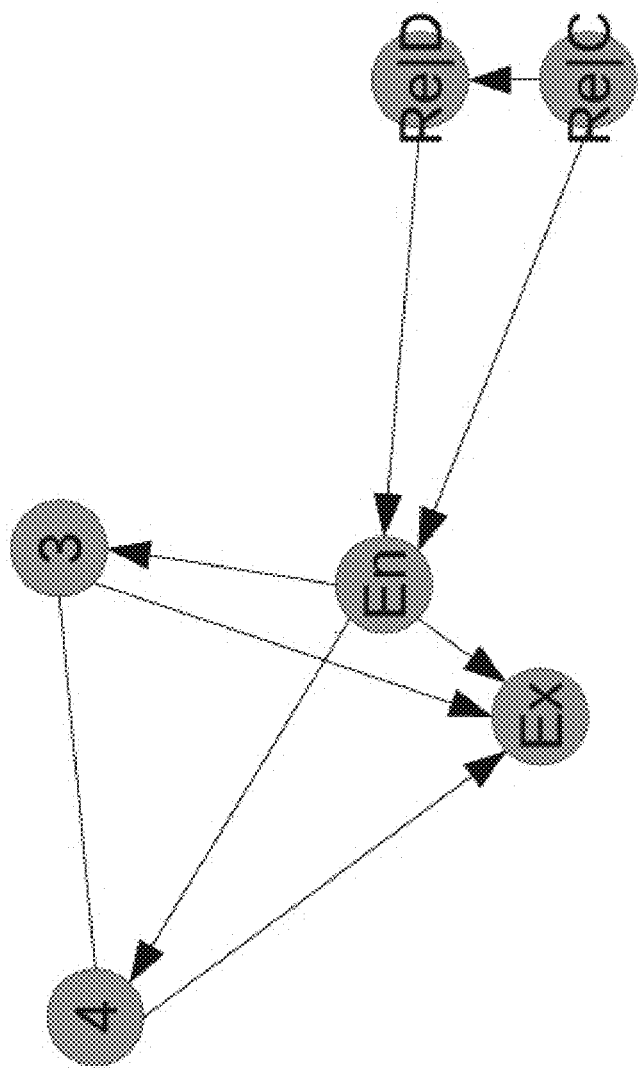
FIG. 7c illustrates a representation of a graph network that defines the set of constraint rules applicable to the space of FIG. 7b.

FIG. 7b illustrates a representation of a simple monitored space and the fields of view contained therein. It will be appreciated that 5 fields of view are being tracked. FIG. 7c illustrates a representation of a graph network that defines the set of constraint rules applicable to that space. It will be appreciated that various edges are directional. For example, when entering the enclosed room (EN), the only permitted actions are to move to dwell space (3), to dwell space (4), or to exit the room (Ex).

Figure 7D:
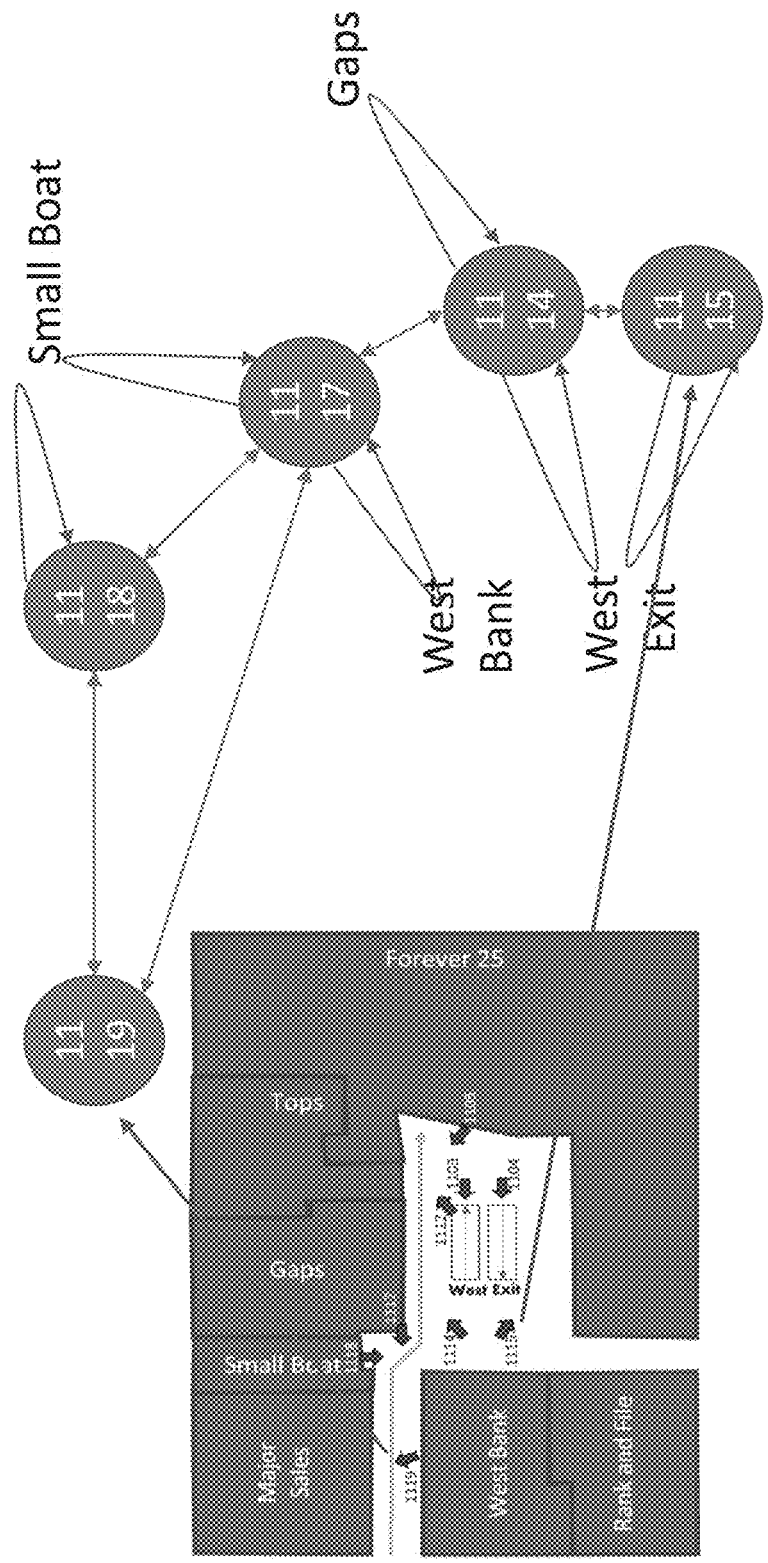
FIG. 7d illustrates another tracked space and its representative graph network according to another example embodiment.

FIG. 7d illustrates another tracked space having 5 fields of view and the graph network representing the relationship amongst the fields of view defining the set of constraints.

A second factor linking the sets of tracks for any one camera and the set of tracks is the relationships defined in the anonymized characterizing feature set for each track. As a given real-world person moves through the fields of views of multiple cameras, a plurality of track entries will be generated for that person within the sets of tracks for those cameras. Because the non-biometric information for the person does not change within a localized setting (ex: within a short time interval and within a small geographic area), the anonymized characterizing feature sets for these tracks should have fairly consistent values. This is the case even though the person has not been uniquely identified based on the person's biometric information. By contrast, anonymized characterizing features sets in track entries for different real-life persons will have substantially different characterizing feature set values (ex: because the real-life persons wore different outfits, which generates different color and accessory patterns).

A method of combining multiple track entry to build a multi-camera journey includes, for a given pair of tracks for two cameras/video streams, determining whether the tracks comply with the sets of constraints linking the two cameras/video streams. If the sets of constraints are not complied with then the pair of tracks are discarded for forming a link.

If the track entries satisfy the set of defined constraints, it is further determined whether the anonymized characterizing feature sets for the tracks exhibit a sufficient match. Where there is such a sufficient match, the tracks are a candidate pair for forming a link as belonging to a journey carried out by the same real-world person.

For example, where the anonymized characterizing feature set for any track is defined as a vector (as illustrated in FIG. 6), the level of matching between two feature sets for any two tracks can be determined by calculating a distance between the vectors.

According to an example embodiment, for a given track, every other track that satisfies the set of defined constraints is determined. The matching levels of the anonymized characterizing feature sets between the given track and every one of the satisfying tracks are then determined. The track amongst these satisfying tracks that has highest the matching level (ex: closest vector value to the vector value of the given track) is then selected for forming the link with the given track. The other candidate tracks are discarded for forming a link with the given track.

Where the given track is already linked with another track, the further linking of an additional track can lead to forming a chain of tracks having more than two tracks. The linked track entries of the chain are aggregated to form a journey entry. The linking of track entries and the forming of journey entries can be carried out at the traffic analysis module 64 using track entries data for multiple cameras stored at the privacy-aware storage module 56.

Figure 8:
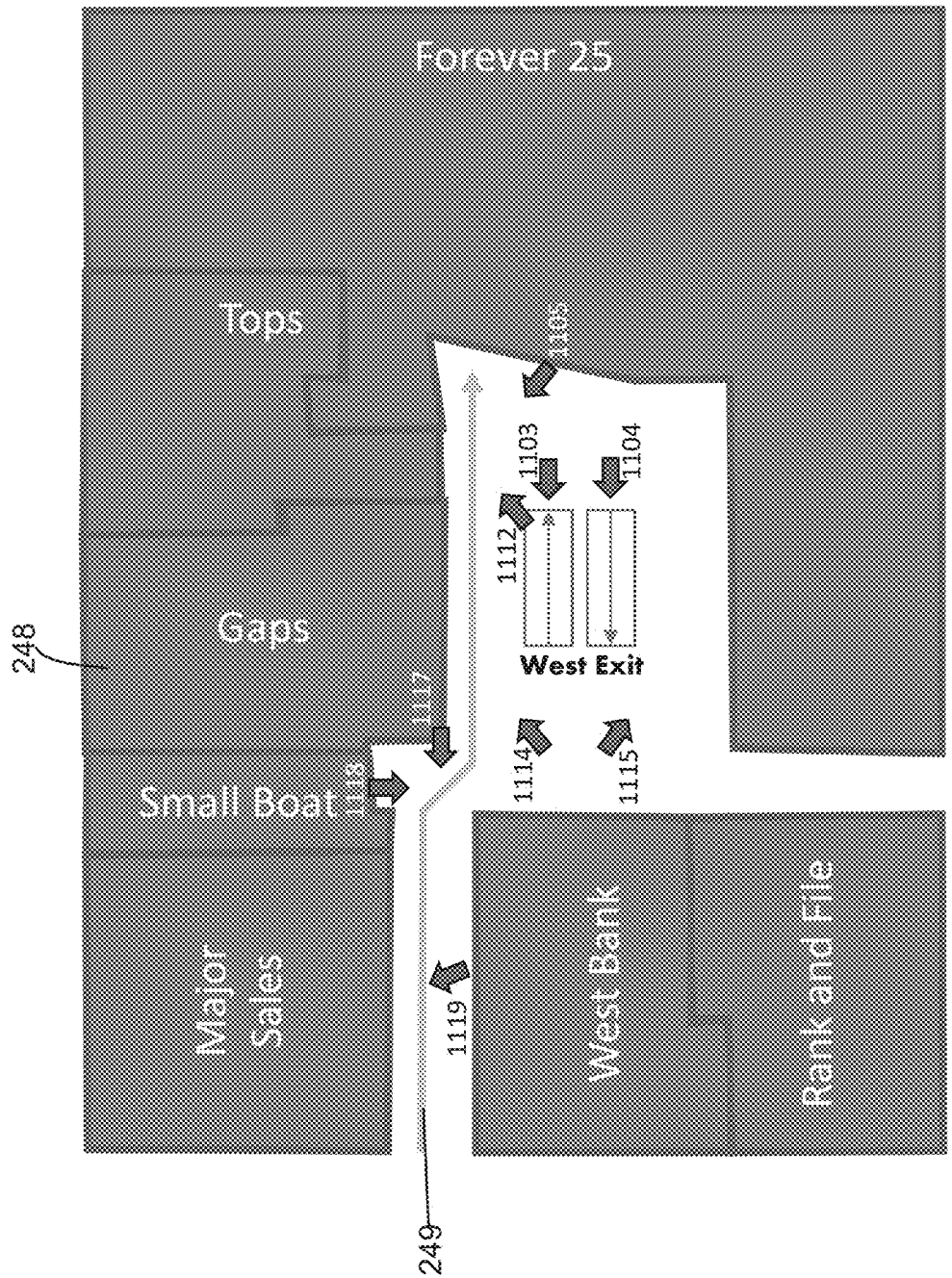
FIG. 8 illustrates a floorplan of a monitored space in which a journey entry is also shown.

FIG. 8 illustrates a floorplan 248 of a monitored space in which a journey entry 249 is also shown. The journey entry is generated by linking track entries generated for a plurality of cameras deployed within the monitored space. The track entries used to generate the journey entry were initially generated based on the movement of the same real-world person individually captured by each of the cameras. Once formed by linking these track entries, the journey entry provides information on how that person travelled across monitored space over multiple fields of view.

Figure 9A:
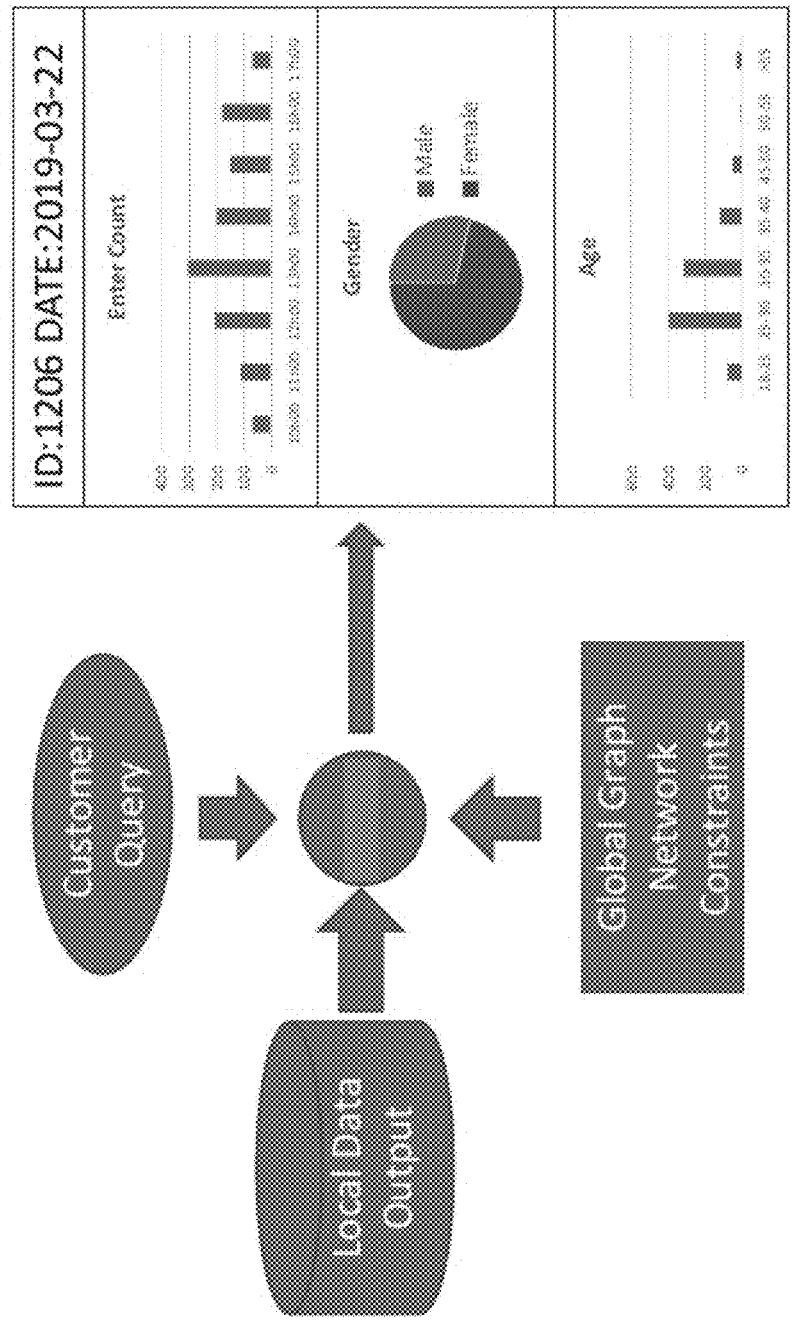
FIG. 9a illustrates an exemplary privacy-aware generated report.
Figure 9B:
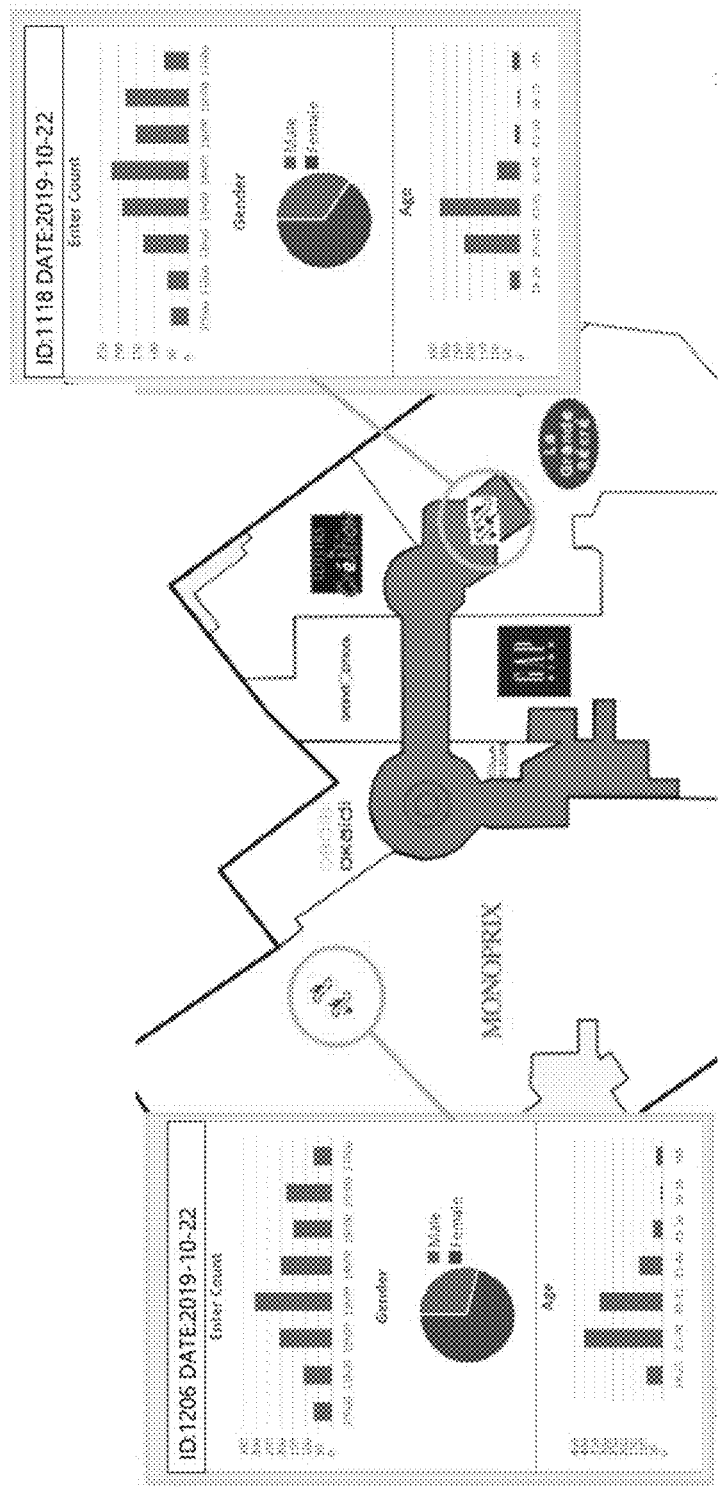
FIG. 9b illustrates exemplary privacy-aware reported generated for two tracked locations.
Figure 9C:
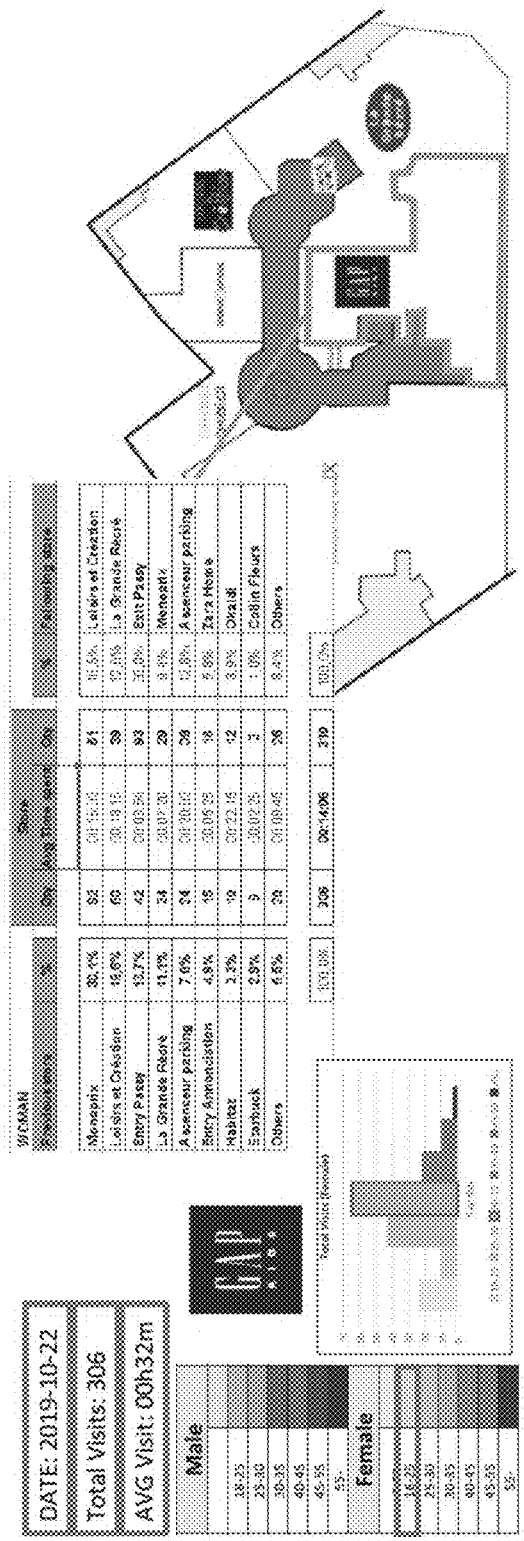
FIG. 9c illustrates details of an exemplary privacy-aware generated report.
Figure 9D:
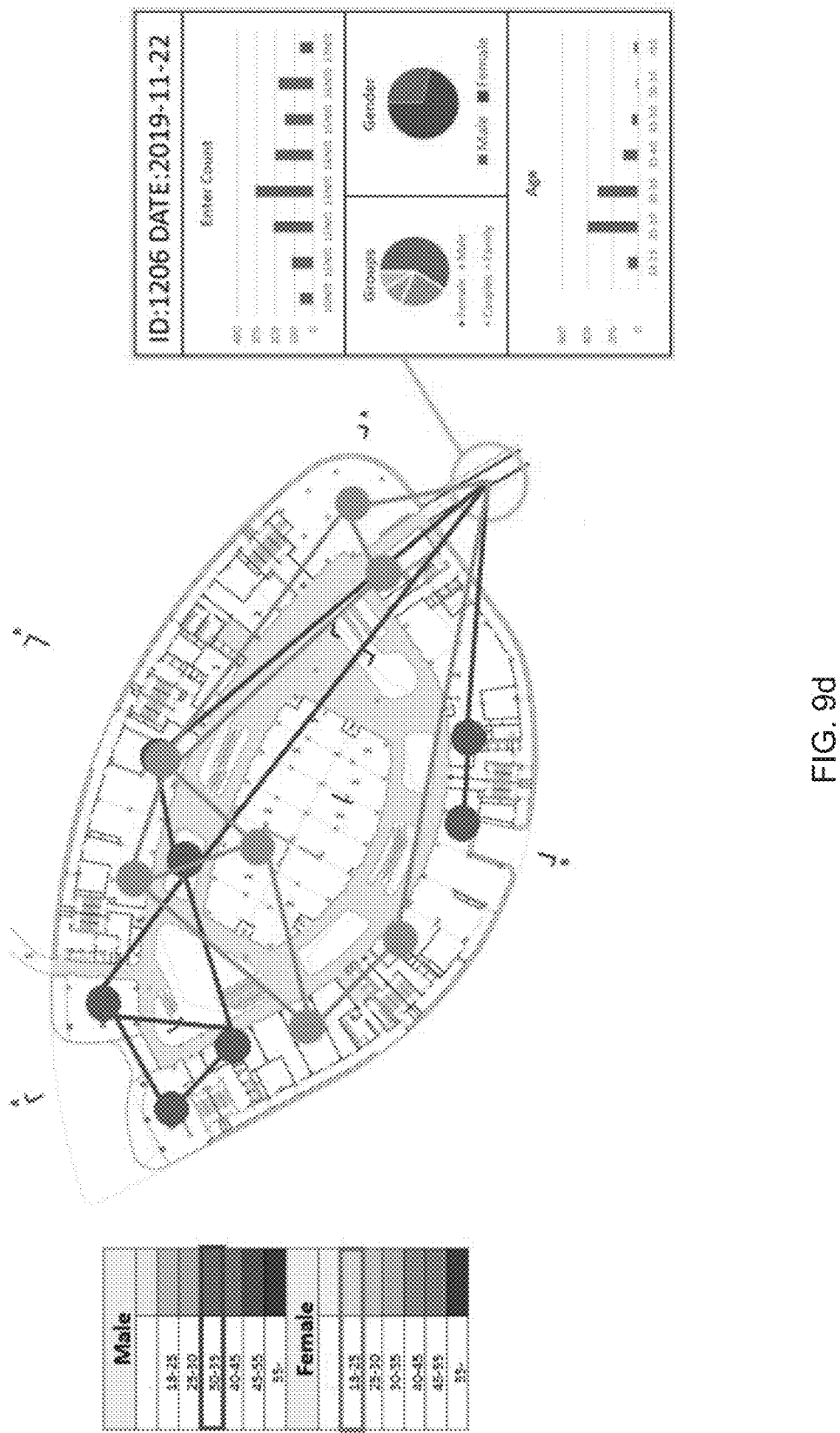
FIG. 9d illustrates details of another exemplary privacy-aware generated report showing popular journeys.

Generally, in foot traffic analysis, information regarding how people move about a monitored space can be of particular interest. Such information can be useful for operational, commercial, marketing, security, and/or other purposes. In particular, a person's journey in the monitored space characterizes how the person moved between different areas of the monitored space and even actions carried out by the person. For example, in a retail setting, a person's journey can include entering a mall, passing by a sequence of stores, dwelling at a window of a store, entering and exiting a store, going to sections of a store, passing by a point of sales, etc. The creation of a journey entry by linking track entries allows obtaining journey-related information. For example, FIG. 9d illustrates two graph networks that represent popular journeys carried out by particular demographic classes. These journeys can be generated by aggregating individual journeys of unidentified persons within the given demographic class.

According to various example embodiments, at least one additional contextual classifier extraction can be applied to the series of images of an unidentified person. The additional contextual classifier extraction generates a contextual data set about the unidentified person without uniquely identifying that person. In particular, the contextual dataset about the unidentified person is insufficient for uniquely identifying that person. The additional contextual classifier extraction can be applied to a given one of the series of images or a detected body region.

The contextual data set can include one or more demographic information of the unidentified person. The demographic information is sufficiently high-level so that the person cannot be uniquely identified. The contextual data can be stored within the track entry. For example, the track entries illustrated in FIG. 6 show contextual data gender, age, and glasses.

In one embodiment, the detected face subregion can be processed to extract features that permit contextual classification. Classification is then applied to the features to generate the contextual data, such as demographic data. Following the generation of the contextual data, any unique identifying data, including the raw face subregion are deleted. This deletion can be carried out immediately after the generation of the contextual data. Only the contextual data is stored.

Figure 5C:
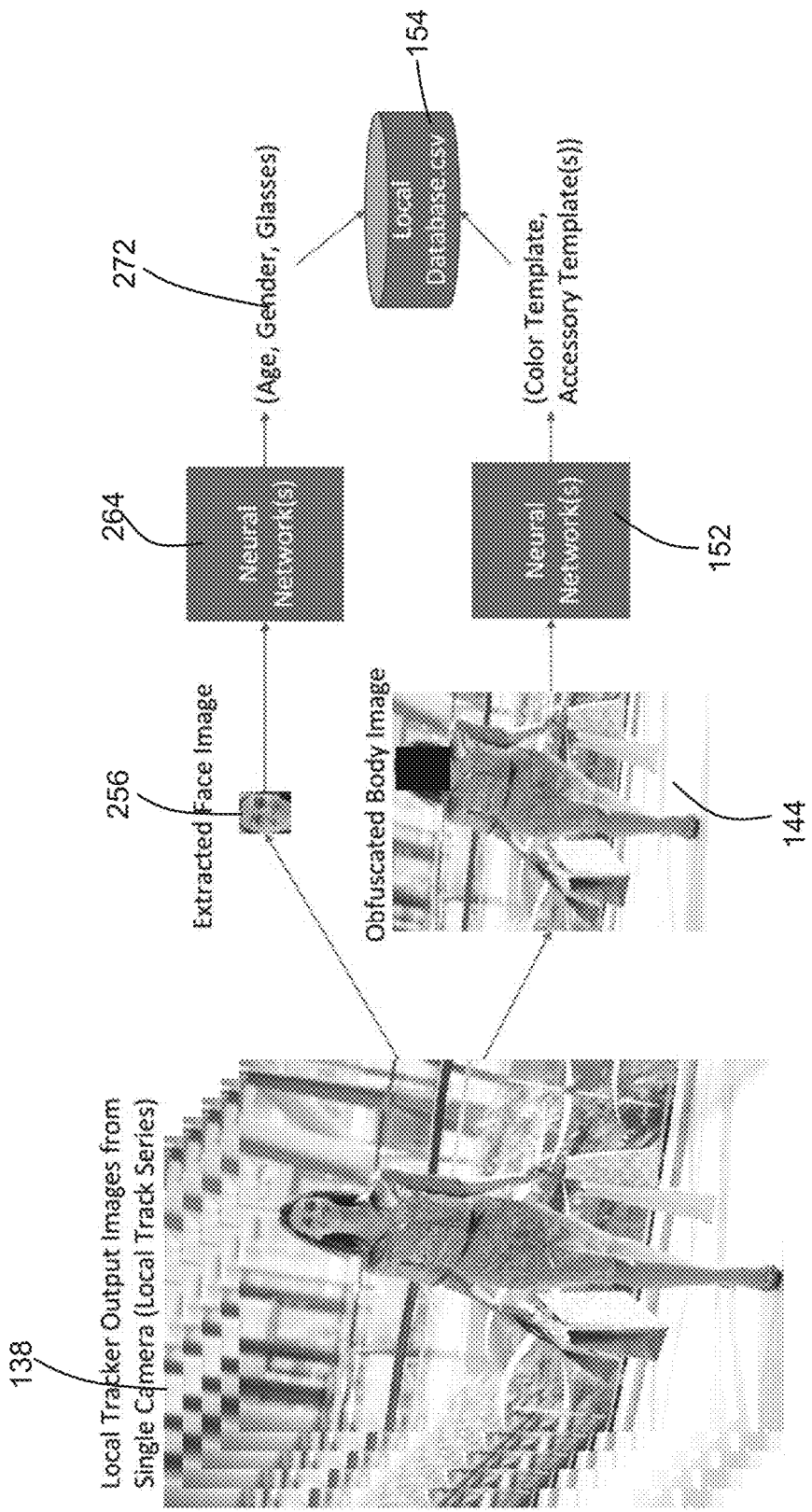
FIG. 5c illustrates a schematic diagram graphically showing the processing steps for generating contextual data along with the generation of the characterization feature set according to one example embodiment.

Referring now to FIG. 5c, therein illustrated is a schematic diagram graphically showing the processing steps for generating the contextual data. It will be appreciated that the contextual data is also generated from the series of images 138. In the illustrated example, the face subregion 256 is extracted from the detected body region. This face subregion 256 is extracted independently from the anonymized body region. The face subregion 256 is further fed into a second classifier 264, which may be a second neural network 264. It will be appreciated that the second neural network 264 operates independently from the neural network 152 that processes the anonymized body region 144. The second neural network 264 performs the classification from the face subregion and determines the contextual data, such as age, gender glasses. The classification can include extracting features that permit the classification, applying anonymized classification of the features, followed immediately by deletion of any uniquely identifying data (ex: the raw face subregion image), such that no unique identification, nor any template or feature vector is applied within the classification. The contextual data is stored in association with the movement dataset and characterizing feature set for the unidentified person within a track entry. The second neural network 264 can apply a combination of classification feature extraction and demographic classification according to various facial recognition methods known in the art, but the deletion of the uniquely identifying data must be performed once demographic classification is complete.

The journey entries constructed from the track entries can be further analyzed to generate anonymized traffic data. This analysis can be carried out at the traffic analysis submodule, which may be located at a network location that is remote of the privacy-aware storage module 56. As described elsewhere herein, the anonymized traffic data can be delivered to an external customer 72. This data is useful for the external customer to understand traffic flow within the space monitored by the camera subsystem 8. The information contained in the anonymized traffic data can be structured according to query criteria defined by the external customer. For example, the query criteria can include one or more of the following:

- enter count;
- exit count;
- dwell time at a given location;
- any count based on time;
- any count based on age;
- any count based on gender;
- transitions between specifically defined areas or zones of the monitored area;
- conversion rate and sequence among each of the two locations segmented by demographic class;
- the popular journey was taken by specific demographic classes (women in 18-25 age range, represented by the path shown in FIG. 9d).

It will be appreciated that where contextual data is available, such as demographic information, such contextual data can also be considered when generating traffic flow data.

It will be further understood that while the outputted anonymized foot traffic data is generated from analysis of the journey entries, which themselves are constructed from linking track entries, the outputted anonymized traffic data does not itself contain any individual journey entries, nor any individual track entries. This ensures that the external customer cannot uniquely identify any person by performing a correlation of anonymized traffic data with other information available to them, such as point-of-sales information or access control information.

According to one example embodiment, the generating of the anonymized foot traffic data includes a step of anonymizing the anonymized foot traffic data. As described above, the journey entries can be grouped by query criteria and a count for each group is generated. This information can further be anonymized by determining any group that has a count value less than a predetermined count threshold. Any group that has a count value that is less than the predetermined count threshold is suppressed. This suppression can be carried out by changing the count value for that given group to a '0' value. For example, the count threshold can be set at '1' and any group having a count value of '1' will be suppressed. It will be appreciated that any group that would have a low count value, such as only having one journey entry belonging to that group (ex: if there is only one female over the age of 65 between the times of 3 PM and 4 PM), provides a greater possibility of uniquely identifying that person. The suppression of the count value ensures this information is not made available within the delivered anonymized foot traffic data.

Other anonymizing steps may include deleting all track entry information and journey entry information for any person identified as being less than a threshold age, such as 18 years or below.

Furthermore, the grouping of journeys is not carried out on the anonymized characterizing feature set. In this way, metrics cannot be generated based on clothing. This ensures that there is no grouping based on employee uniforms, which would otherwise permit singling out this class.

Referring now to FIGS. 9a, 9b, 9c, and 9d therein illustrated are four graphical outputs showing the anonymized traffic data that can be made available to an external customer. It will be appreciated that this information provides useful foot traffic metrics for the customer to understand foot traffic behavior but the information is sufficiently anonymized that the customer cannot uniquely identify any person considered when generating the data.

Privacy-Aware Operation of a Computer-Implemented Classification Module

A computer-implemented classification module based on artificial intelligence, such as one built on neural networks architecture, is typically pretrained in an offline setting prior to deployment. The offline training of the computer-implemented classification module is carried out using a training dataset. The training dataset typically includes training samples that are captured in a generalized setting. That is, the training samples are obtained in a test environment that is relevant to the actual operating environment where the pre-trained computer-implemented classification module will be deployed, but that there are sufficient differences between the test environment and the actual operating environment such that the performance of the pre-trained computer-implemented classification module may be lower in the actual operating environment due to such differences. To adapt to the differences between the test environment and actual operating environment and to counter the possible drop in performance, continuous learning by the computer-implemented classification module is utilized, whereby the computer-implemented classification module is further trained by machine learning using new samples captured from the actual operating environment while the computer-implemented classification module is operating. This type of training/learning by the computer-implemented classification module is often called "online learning".

It was identified that because online learning by the computer-implemented classification module uses real-life samples captured in the actual operating environment, the samples contain privacy-sensitive information. Such privacy-sensitive information may include biometric information of persons captured in the real-life samples. For example, where the computer-implemented classification module is used to track actions and/or behaviour of persons (ex: tracking movement of persons within the tracked space) from captured video streams, raw real-life samples captured in the actual operating environment are in the form of images captured of persons, which can include the persons' biometric features, such as the persons' faces, that allow for uniquely identifying these persons. Since the real-life samples contain privacy-sensitive information, they must be also be handled in a privacy-aware manner when used for online learning of a computer-implemented classification module. As defined above, this "privacy-aware" manner means the processing of the real-life samples with particular consideration for privacy-related issues, such as to ensure compliance with applicable privacy-related legislation, protocols or regulations (ex: GDPR). It was observed that there is a need for solutions for carrying out online learning of computer-implemented classification modules in a privacy-aware manner.

Broadly described, the solution for the privacy-aware operation of at least one computer-implemented classification module includes limiting the access to and/or processing of data that would allow uniquely identifying a person captured in a data element. The access/processing of this data may have a temporal restrictions, such as being limited in time relative to the moment each data element is actually captured and/or relative to the time the data element is received from a secured source. Additionally, or alternatively, the access/processing of this data may also have a geographic restriction, such as being limited in location relative to the geographical location where each data element is actually captured. The limiting of access/processing of data that includes privacy-sensitive information, such as biometric features of a person (ex: face image) and/or that would allow unique identification of a person, is also applied when the data is used to train the at least one computer-implemented classification. This limiting of access/process of the privacy-sensitive data includes being applied to any sharing or transmission of the data to other computing devices or computing nodes other than devices implementing the classification module, which sharing/transmission may be required as part of the training (ex: transmitting captured samples to other user devices for supervised training). The limiting of access/processing of data may be tiered depending on whether the data has been processed to anonymize the captured data. That is, raw data having privacy-sensitive information is subject to limitations that are different from those applied to data that has been processed for anonymization.

Various example embodiments of a method and/or a system for privacy-aware operation of at least one computer-implemented classification module having online learning is described hereinbelow with reference to a privacy-aware video stream analysis system 1 previously discussed hereinabove (but with modifications made to that system), but it will be understood that the privacy-aware operation of the at least one computer-implemented classification module can be generally applicable to any classification module requiring privacy-aware operation and is not to be understood as being limited to the video stream analysis system 1 only. For greater clarity, various example embodiments for privacy-aware operation is applicable to any type of data elements captured for one or more unidentified persons present at a monitored geographic location. An example of a non-image privacy-sensitive data element includes the MAC address of electronic devices being used in the monitored geographic location.

The system and method for privacy-aware operation of a computer-implemented classification module with privacy-aware online learning according to various example embodiments include capturing a plurality of data elements of one or more unidentified persons present at a monitored geographic location.

As described hereinabove, where the data elements are captured images, a monitored physical space (ex: shopping mall, airport, office building, etc.) can have a plurality of cameras 16 that each capture images of objects passing through its respective field of view over time. The cameras 16 can be part of a surveillance camera subsystem 8 deployed at the monitored space. The images can be taken from video streams captured of unidentified persons by the cameras 16. Other forms of non-camera data capturing sensors can also be used in the monitored geographic location.

The monitored geographic location is the actual geographic location of the monitored physical space, which also corresponds to the geographic location of each person at the time that they are captured by one of the cameras 16 and/or non-camera sensors. The monitored geographic location can be defined by the address of the monitored space or by its longitudinal and latitudinal coordinates. When defined by its address, the monitored geographic location can be defined on the basis of the territory where it is located, such as at a town/city/municipality level, a province/state level, a country level, and/or a common economic area (ex: European Union).

For the purposes of the privacy-aware operation of a computer-implemented classification module with privacy-aware online learning, each of the plurality of captured data elements (ex: captured images) is used as an operational data element (ex: operational image) that is to be classified and/or is used as a training data element (ex: training image) for training the computer-implemented classification module by online learning. A captured data element can be used both as an operational data element and as a training data element. Accordingly, a first set of the captured data elements are used as training data elements and a second set of the captured data elements are used as operational data elements. For greater clarity, according to various embodiments, only a portion of the captured data elements are used as training data elements for online learning by the computer-implemented classification module.

For each one of the operational data elements of the captured data elements, the computer-implemented classification module is operated to process the given operational data element to determine a respective processed dataset. The processed dataset that is determined (i.e. outputted) by the computer-implemented classification module can be a contextual dataset. As described hereinabove, the contextual dataset provides contextual information about an unidentified person captured without uniquely identifying that person. Where the operational data elements are captured images of persons, the contextual dataset can include information such as gender, age and the wearing of accessories, such as glasses. It will be appreciated that this corresponds to the normal operation of the computer-implemented classification module to classify the captured operational image. This classification can be carried out in a privacy-aware manner so that the outputted dataset is contextual only and does not uniquely identify the person.

As described elsewhere herein, the processing of captured data elements by the computer-implemented module includes determining the contextual dataset based on biometric features of a person captured in the operational data elements. Since these biometric features are privacy-sensitive (these features can be used to uniquely identify a person), the processing must be carried out in a privacy-aware manner.

The computer-implemented classification module is operated at at least one operational geographic location that each have a geographic commonality with the monitored geographic location. It will be understood that the computer-implemented classification module can be embodied on one or more computing devices that are physically located at one or more physical geographic locations, which are the operational geographic locations of the computer-implemented classification module (ex: one or more computing devices/nodes operated together over a connected network). Each of these physical geographic locations where the computing devices are located has the geographic commonality with the monitored geographic location.

The geographic commonality between any one geographic location where a given computing device is located and the monitored geographic location herein refers to the two geographic locations having a sufficient locality such that privacy-sensitive information can be transmitted to the computing device in a privacy-compliant manner. It will be appreciated that which legislation, protocols and/or regulations defining the permitted handling of privacy-sensitive is applicable is based on the location where that information was captured. The legislation, protocols and/or regulations will further define the territorial or geographic boundaries within which the privacy-sensitive information can be transmitted while remaining privacy-compliant. The privacy-related regulation can be General Data Protection Regulation (GDPR).

For example, where a given regulatory regime applies to a given territory (ex: country), that regime may restrict the transmission of any privacy-sensitive within that territory only (ex: within the same country). In such a case, if the monitored geographic location is located in that territory, then any computing device (ex: ones implementing the classification module) located within that same territory will have geographic commonality with the monitored geographic location. By contrast, where the privacy-sensitive information is transmitted to another computing device physically located outside that territory, that other computing device does not have geographic commonality with the monitored geographic location.

Geographic commonality may be defined based on different levels of territoriality, such as at a town/city/municipality level, a province/state level, a country level, and/or a common economic area (ex: European Union), depending on the applicable legislative/regulatory regime.

Geographic commonality may also be defined based on distance, such as the distance between the monitored geographic location and the processing computing device must be within a specified distance within one another.

It will be understood that a given computer-implemented classification module having a geographic commonality with the monitored geographic location herein refers to a specific configuration of the computing devices implementing the classification module such that those computing devices have the geographic commonality. That is, there is a deliberate consideration in the designing of the deployment of the computer-implemented classification module to ensure that the geographic commonality criterium is satisfied. According to various example embodiments, the deployment of the computer-implemented classification module when in operation or when in training involves restricting or preventing processing any captured data element at any location lacking geographic commonality with the monitored geographic location. For example, there may be a step of defining the boundaries of geographic commonality based on the monitored geographic location, checking the current location of each computing device being used to implement the classification module, and preventing any processing of the captured data element by that computing device if the current location is located outside the boundaries.

For each given one of the training data element of the captured data elements, the computer-implemented classification module is trained by online learning using the given training data element. The training of the computer-implemented classification module by online learning using the training data element is constrained by having at least one processing restriction applied to the training to ensure compliance with at least one privacy-related regulation. The privacy-related regulation includes the regulation(s), legislation(s) and/or protocol(s) applicable for the monitored geographic location where the training data element is captured. The privacy-related regulation may be GDPR.

The processing restriction can be a temporal restriction applied to the online learning.

The processing restriction can be a geographic restriction applied to the online learning.

According to one example embodiment, the training of the computer-implemented classification by online learning using the given training data element takes place at at least one learning geographic location having the geographic commonality with the monitored geographic location.

It will be understood that the online learning of the classification module can be carried on computing devices that are physically located at geographic locations that are different from the geographic locations of the computing devices implementing the classification module in its operational mode. For example, an operational copy of the classification module can be implemented on a first set of one or more computing devices located at geographic locations having geographic commonality with the monitored geographic location. At the same time, a training copy of the classification module can be implemented on a second set of one or more computing devices located at geographic locations that are different from the locations of the first set of computing devices, but that also have geographic commonality with the monitored geographic location. The operational copy of the classification module can then be updated intermittently with the training copy of the classification module.

It will be understood that the online learning of the classification module may involve computing devices accessing training data elements in which those computing devices do not themselves implement the classification module. According to one example embodiment, training data elements can be sent to computing devices used by human experts so that the human experts can provide annotations of the training data elements, which can be used for supervised learning of the classification module. This supervised learning includes querying the human expert by transmitting the training data element (ex: training image) to the computing device used by the human expert, displaying the training data element on the expert's computing device, and receiving an annotation for the training data element from the expert interacting with the computing device. The received annotated training data element is then used to train the classification module by machine learning (which may be online learning or offline learning depending on whether the data element has been anonymized). The use of these computing devices for human-supervised annotation is also considered as part of the training the computer-implemented classification and these computing devices also have geographic commonality with the monitored geographic location.

Figure 10:
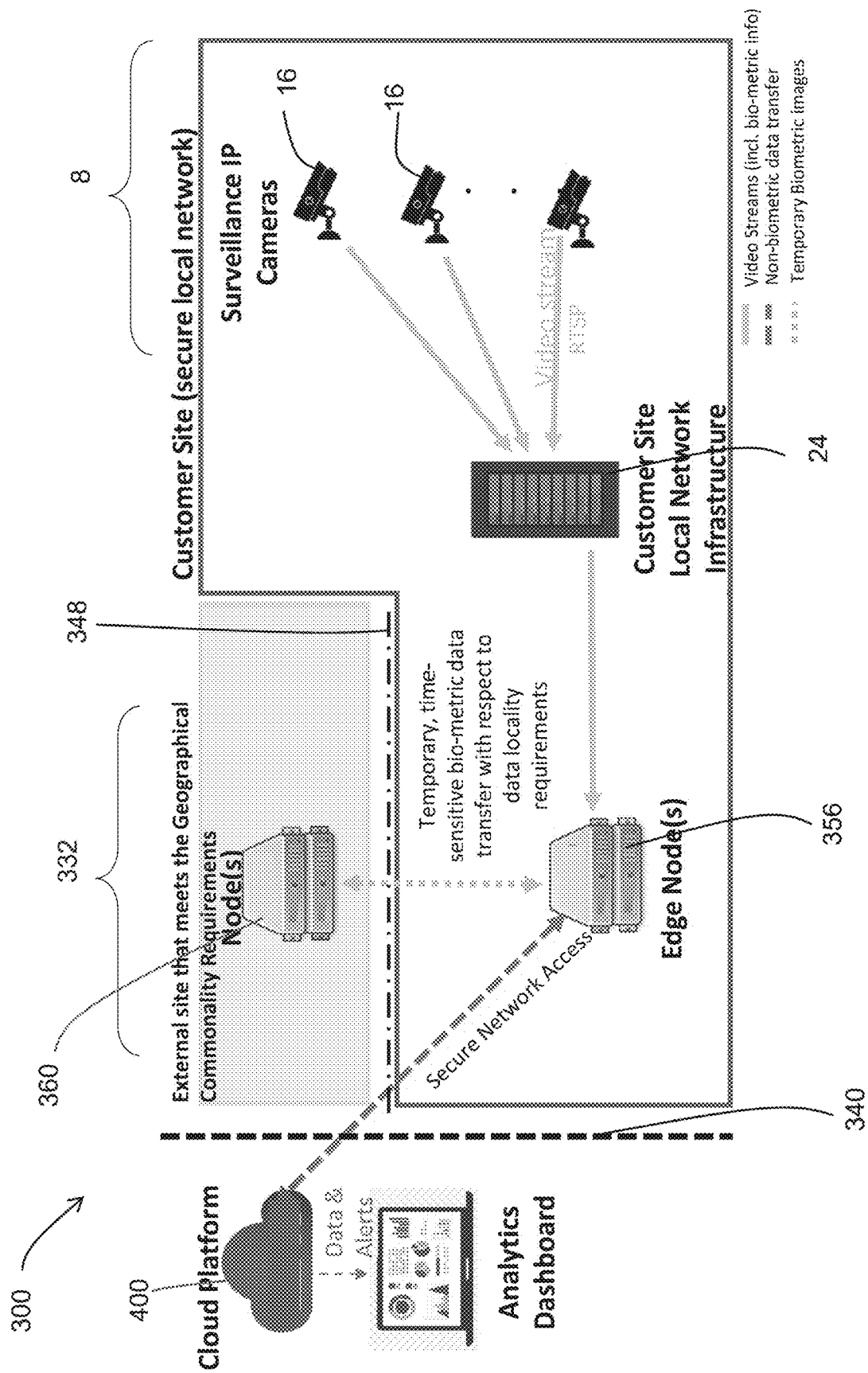
FIG. 10 illustrates a schematic diagram of a privacy-aware training-enabled analysis system according to one example embodiment.

Referring now to FIG. 10, therein illustrated is a schematic diagram of a privacy-aware training-enabled analysis system 300 implementing one or more privacy-aware classification modules having online learning according to one example embodiment. The system 300 describes a modified privacy-aware video stream analysis system 1 described herein but is applicable to a more generalized system having classification modules with online training.

The privacy-aware training-enabled analysis system 300 includes a camera subsystem 8 that includes the plurality of camera 16 deployed at a monitored space having a monitored geographic location. Each camera 16 generates a respective captured video stream and the server 24 receives the captured video streams, stores the streams, and makes available the streams for viewing or analysis. The server 24 is considered a secured source of storage of captured data.

The privacy-aware training-enabled analysis system 300 further includes a set of one or more computing nodes 332 for implementing the computer-implemented classification module. The computing nodes 332 receive captured images contained in the captured video streams from the server 24. The computer-implemented classification module implemented on the computing nodes 332 process biometric features of a person captured in operational images of the received captured images. As described elsewhere herein, each of the one or more computing nodes 332 have geographic commonality with the monitored geographic location. However, it will be understood that the one or more computing nodes 332 can be, but do not need to be, located at the same physical site as the monitored space, the local server 24 or the camera system 16.

Continuing with FIG. 10, boundary line 340 schematically represents the boundaries of geographic commonality with the monitored geographic location where the camera system 8 is located. Elements to the left of the boundary line 340 represent computing devices/nodes that are physically located outside the boundaries of geographic commonality with the monitored geographic location. Elements to the right of the boundary line 340 represent computing devices/nodes that are physically located within the boundaries of geographic commonality with the monitored geographic location. It will be appreciated that the one or more computing nodes 332 are located to the right of the boundary line 340 and have geographic commonality with the monitored geographic location.

Continuing with FIG. 10, the one or more computing nodes 332 are illustrated as being formed of on-site (edge) nodes 356 and off-site nodes 360. On-site nodes 356 are deployed at substantially the same geographic location as the monitored space, such as within the physical premises of the space (ex: in the same shopping mall). The on-site nodes 356 can be computing devices placed at the premises of monitored spaces. Off-site nodes 360 are deployed at one or more geographic locations that are remote of the monitored space, such as at one or more off-site locations. The off-site nodes 360 communicate with the on-site nodes 356 and/or with the server 24 over a suitable communications network. The off-site nodes 360 can be remote servers or cloud-based computing units. Line 348 represents the division between on-site nodes 356 and off-site nodes 360.

The on-site nodes 356 implement a first portion of the processing steps related to the operation of the computer-implemented classification module for generating the contextual dataset and/or related to training the computer-implemented classification module by online learning. The off-site nodes 360 implement a second portion of the processing steps related to the operation of the computer-implemented classification for generating the contextual dataset and/or related to training the computer-implemented classification module by online learning. Since both of the on-site nodes, 356 and off-side nodes 360 are geographically located to have geographic commonality with monitored geographic location, both sets of nodes can receive and process privacy-sensitive information, such as captured operational images containing biometric features and/or captured training images containing biometric features.

According to one non-limiting example, operation of the computer-implemented classification module to process the given operational image to determine a respective contextual dataset is carried by the on-site nodes 356, while training of the computer-implemented classification module by online learning using the training image is carried out by the off-site nodes 360 (ex: on a copy of the computer-implemented classification module).

According to another non-limiting example, the on-site nodes 356 implement both the processing of the operational images to determine contextual datasets and the training of the computer-implemented classification module by online learning using the training image. The off-site nodes 360 include the computing devices used by human experts to review one or more non-annotated training images, whereby the annotations made by the human experts at the off-site nodes 360 produce annotated training images. The annotated training images are returned to the on-site nodes 352 for use in training the computer-implemented classification module by machine learning. It will be appreciated that this configuration allows for greater flexibility in that the supervising human experts can be located off-site of the monitored space instead of having to physically come to the site of the monitored space (so as long as the human experts and the off-site nodes 360 are located at a training geographic location having geographic commonality with the monitored geographic location).

The illustrated example of FIG. 10 shows the computing nodes 332 having both the on-site nodes 356 and the off-site nodes 360, but it will be understood that in other examples the computing nodes 332 can consist wholly of (i.e. include only) of the on-site nodes 356 or consist wholly of (i.e. include only) of the off-site nodes 360.

Figure 11:
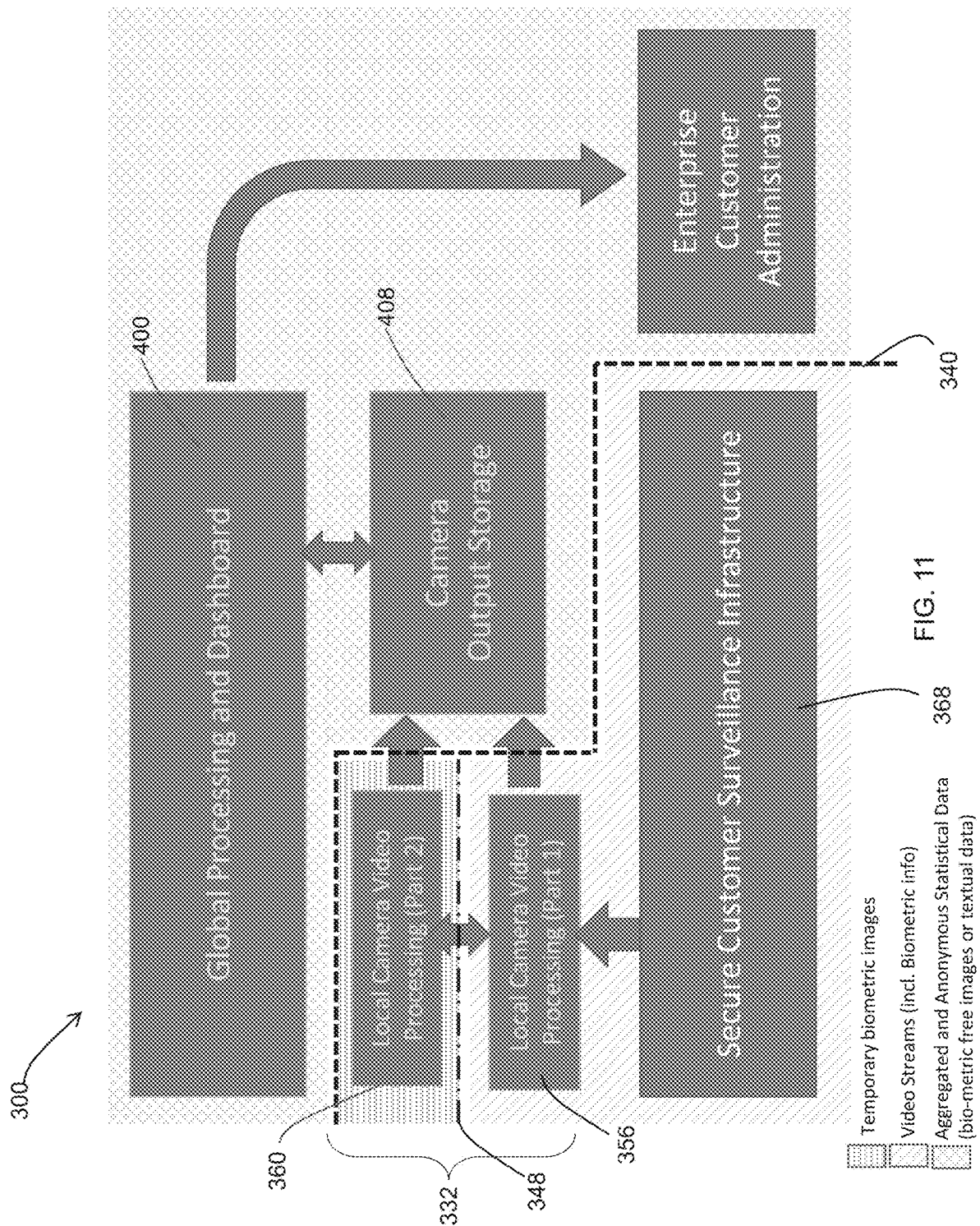
FIG. 11 illustrates a schematic diagram of the computer-implemented processing activity of the privacy-aware training-enabled analysis according to one example embodiment.

Referring now to FIG. 11, therein illustrated is a schematic diagram of the computer-implemented processing activity of the privacy-aware training-enabled analysis system 300 having been segregated by boundaries of geographic commonality and on-site/off-site location according to an example embodiment. FIG. 11 is similar to the schematic representation of FIGS. 2 and 3 but shows geographic commonality and on-site versus off-site location instead of network location and authorized access. FIG. 11 shows a modified privacy-aware video stream analysis system but is also applicable to a more generalized system having a classification module with online training.

Secure customer surveillance infrastructure 368 is formed of the camera system 8 and the video server 24. The captured video stored at the video server 24 is transmitted to the computing nodes 332. The captured video includes the plurality of captured images that form the operational images and/or the training images. A first portion (ex: part 1) of the processing of the captured images is carried out on site by the on-site nodes 356. A second portion of the processing of the captured images is carried out off site by the off-site nodes 360. Line 348 denotes the separation between on-site nodes 356 and off-site nodes 360. As described above, the on-site nodes 356 and off-site nodes 360 carry out respective video/image processing parts (illustrated as parts 1 and parts 2) that together implement the operation of the computer-implemented classification module and the online learning of the computer-implemented classification module.

The operation of the classification module applied to operational images outputs respective contextual datasets. As described elsewhere herein, the contextual dataset for any captured person can include one or more demographic information at a sufficiently high-level so that the person cannot be uniquely identified. Accordingly, the contextual dataset is considered anonymized so that it can be sent to computing nodes that do not have geographic commonality with the monitored geographic location.

The on-site nodes 356 and/or off-site nodes 360 can also carry out an anonymizing step to captured images to generate respective anonymized captured images. These anonymized captured images can also be sent to computing nodes that do not have geographic commonality with the monitored geographic location. As described in greater detail elsewhere herein, the anonymizing of the captured images includes removing or masking a face sub-region of the image and distorting the remaining body sub-region such that the remaining body sub-region is free of any privacy-sensitive information.

Boundary line 340 also denote the boundaries of geographic commonality in FIG. 11, wherein computing nodes located to the left and/or below the boundary line 340 have geographic commonality with the monitored geographic location and computing nodes located to the right and/or above the boundary line 340 are considered to be located outside the boundaries of geographic commonality. Anonymized data (ex: contextual dataset and/or anonymized captured images) can be transmitted across the boundary line 340 to computing nodes located outside of the boundaries of geographic commonality with the monitored geographic location.

As described hereinabove with reference to the privacy-aware analysis system 1, applicable privacy-related legislation, regulation or protocol defines the maximum duration of time captured data elements, such as a video stream (including captured images of the video stream), can be retained for non-security related purposes if that captured data element contains privacy-sensitive (ex: biometric) information. The retention for non-security related purposes includes the processing of the data element. It was observed that any processing of any data element, whether processing an operational data element for determining the contextual dataset or processing a training data element as part of online learning of the classification module, must be completed within the maximum duration so that the captured data element can be discarded in time (i.e. no longer retained). This discarding of the captured data element that includes privacy-sensitive information of the captured data element ensures compliance with the applicable legislative and/or regulatory regime.

According to various example embodiments, to ensure compliance with privacy-related legislation, for a given captured data element that is an operational data element, the operation of the computer-implemented classification module to process the given operational data element to determine a corresponding contextual dataset is completed within an operating time interval after receiving of the given operational data element. The receiving of the given operational data element corresponds to the moment that the given operational data element is received from a secure source storing the captured data element.

In the example of FIGS. 10 and 11 pertaining to captured images (including images from captured video streams), the video server 24 of the camera surveillance infrastructure is considered a secure source and the moment of receiving of the given operational image corresponds to the moment that one of the computing nodes 332 (on-site node 356 and/or off-site node 360) first receives the video stream or captured image from the video server 24 to begin processing of the operational image.

The operating time interval during which the computer-implemented classification module is operated to process the given operational data element is shorter than a predetermined temporal threshold duration. The predetermined temporal threshold duration corresponds to the permitted retention duration as defined by applicable legislation and/or regulation (also called herein the "temporal threshold duration" with reference to the privacy-aware analysis system 1 or the "retention time limit"). According to one example embodiment, the predetermined temporal threshold duration is 4 minutes 59 seconds. The completion of the processing of the operational data element within the operating time interval includes the discarding of the data element after the processing within that operating time interval.

Similarly, to ensure compliance with privacy-related legislation, for a given captured data element that is a training data element, the training of the computer-implemented classification by online learning using training data element is completed within a training time interval after receiving of the given training data element. The receiving of the given training data element corresponds to the moment that the given training data element is received from a secure source storing the captured data element.

In the example of FIGS. 10 and 11 pertaining to captured images (including images from captured video streams), the video server 24 of the camera surveillance infrastructure is considered a secure source and the moment of receiving of the given training image corresponds to the moment that one of the computing nodes 332 (on-site node 356 and/or off-site node 360) receives the video stream or captured image from the video server 24 to begin online learning of the computer-implemented classification module using the training image.

Where a training data element is also an operational data element (in that the captured data element is also used for determining the contextual dataset), the receiving of the given training data element corresponds to the first moment the captured data element is received from the secured source.

The training time interval during which the computer-implemented classification module is being trained by online learning using the training data element is shorter than the predetermined temporal threshold duration. This is the same predetermined temporal threshold duration compared to which the operational time interval is also shorter. Since the training time interval and the operating time interval both have an upper bound corresponding to the predetermined temporal threshold duration, the two time intervals can have the same duration, but it will be understood that their durations may be different if the duration of time taken to complete online learning differs from the time taken to complete processing of the operational data element. The completion of the online learning of the computer-implemented classification module within the training time interval includes the discarding of the training data element after online learning of the computer-implemented classification module using the training data element. For greater clarity, the processing of the given data element by the classification module in its operational mode and the online learning of the classification using the same data element can be carried out in parallel, wherein the longer of the processing (operational time interval) and the online learning (training time interval) is to be completed within the predetermined temporal threshold duration.

As described elsewhere herein, the training of the computer-implemented classification module by machine learning may include having a human expert review the training data element and annotating the training data element so that the online learning is carried out based on the annotated training data element. According to such example embodiments, the process of annotating the training data element and the training of the classification module by online learning using the annotated training data element are completed within the training time interval that is shorter than the predetermined temporal duration. More specifically, the process of querying the human expert, receiving an annotation for the training data element from the human expert (which includes displaying the data element image to the human expert and receiving the annotation), the training of the computer-implement classification by online learning with the annotated training data element and the discarding of the annotated training data element are all completed within the training time interval.

Figure 12:
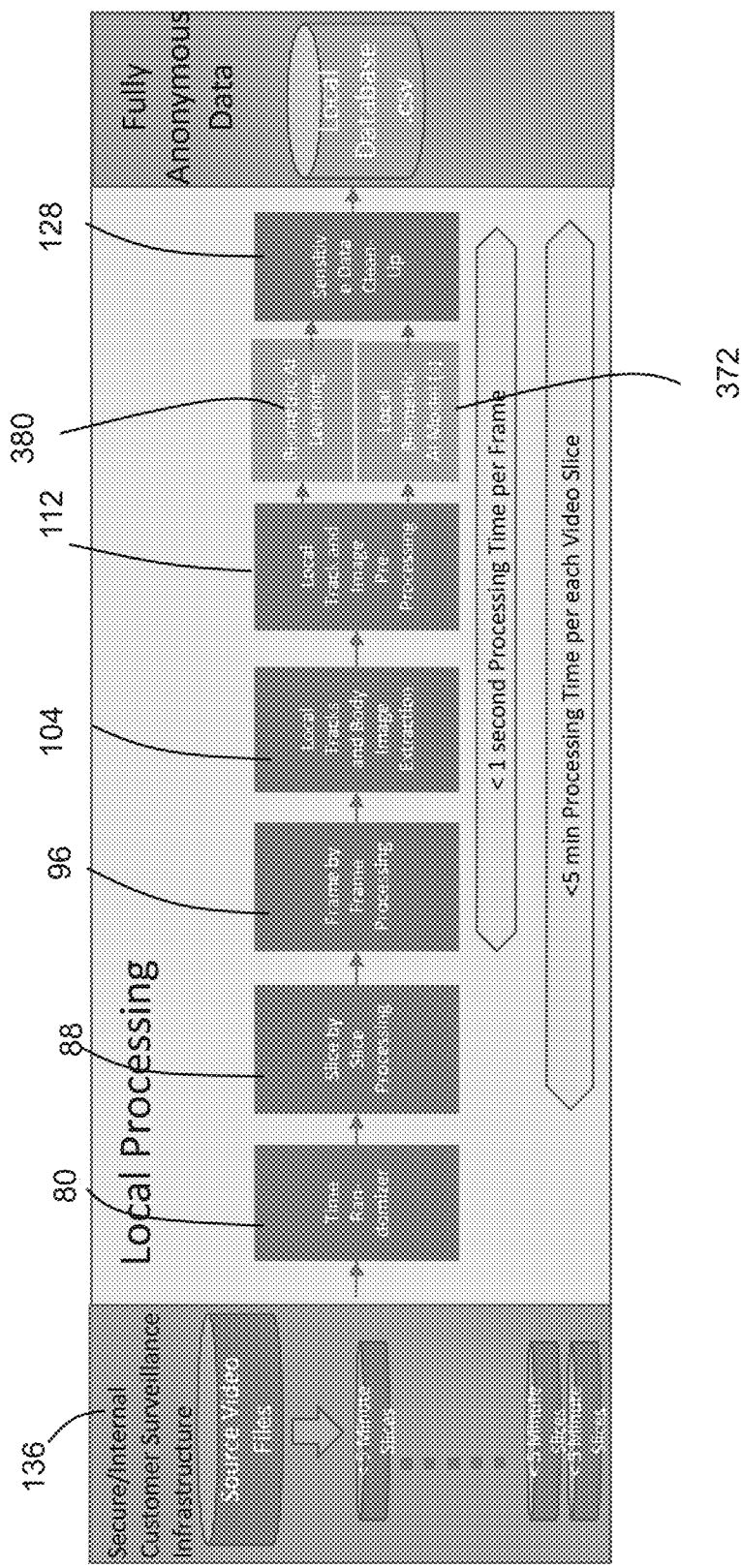
FIG. 12 illustrates a schematic diagram of the operational submodules of privacy-aware operations carried out at computing nodes of a training-enabled system according to one example embodiment.

Referring now to FIG. 12, therein illustrated is a schematic diagram of the operation submodules of privacy-aware operations carried out at computing nodes having geographic commonality with the monitored geographic location. These operations can be substantially similar to the operations of the privacy-aware tracking module 48 as described herein with reference to FIG. 4*a*, but with the addition of the artificial intelligence model 372, which is part of the computer-implemented classification module, and the training module 380 for online learning of the computer-implemented classification module. It will be appreciated that the model 372 acting on operational images by the computer-implemented classification module and/or the training by training module 380 of the classification module and the discarding of the captured images (by data clean-up module 128) are all completed before the expiry of the predetermined temporal duration after receiving the captured image (or the video stream that includes the captured image). In the illustrated example of FIG. 12, this predetermined temporal duration is less than 5 minutes, such as 4 minutes 59 seconds.

According to various example embodiments, the time-limiting of the processing of the given operational data element by the computer-implemented classification module to the operational time interval and the time-limiting of online learning of the computer-implemented classification module to the training time interval can be implemented as a standalone privacy-aware measure. According to other example embodiments, this time-limiting privacy-aware measure can be implemented in combination with the restricting of the processing of the operational data element and the online learning of the classification module to the operating geographic location and the training geographic location having geographic commonality with the monitored geographic location.

The description provided so far pertain to the processing of operational data elements by the classification and the online learning of the classification module using training data elements in which the data elements includes privacy-sensitivity information for the entirety of the processing and the online learning. According to various further example embodiments, the privacy-aware training system 300 includes at least one additional module configured to generate anonymized data elements. Accordingly, the classification module described herein above that acts on privacy-sensitive data elements to determine contextual datasets represents a first classification module of the system 300. According to such embodiments, the privacy-aware training-enabled analysis system 300 further includes at least a second computer-implemented classification module that is configured to operate on anonymized captured data elements and that is not restricted to being implemented at any location having geographic commonality with the monitored geographic location.

The second computer-implemented classification module also uses data elements captured at the monitored geographic location. Each of the plurality of captured data elements is used as an operational data element that is to be classified and/or is used as a training data element. Of the training data elements, a first subset of the training data elements can be used for training the first computer-implemented classification module and a second subset of the training data elements can be used for training the second computer-implemented classification module. A training data element can be used both for training the first computer-implemented classification module and for training the second computer-implemented classification module. Therefore, the first subset of training data elements and the second subset of training data elements can have some overlaps before anonymizing of the second subset of training data elements.

For each given one of the operational data elements of the captured data elements to be processed by the second computer-implemented classification module, the operational data elements are anonymized prior to being processed by the second computer-implemented classification module. The anonymizing of the operational data elements is carried out by one or more computing nodes physically located at at least one geographic location each having a geographic commonality with the monitored geographic location where the given operational data elements was captured. This represents a first privacy-aware measure in the anonymizing step. Additionally, or alternatively, the anonymizing of the operational data elements is completed within a processing time interval from the receiving of the operational data elements from a secure source. This processing time interval can be the same time interval taken by the first classification module to process the operational data elements to determine the contextual dataset. This represents a second privacy-aware measure in the anonymizing step. The anonymizing outputs an anonymized operational data element.

As described elsewhere herein, anonymizing the data elements includes applying an active step to remove at least one feature within the captured data element that would otherwise permit the identification of the person captured in the data element. The at least one feature can be a biometric feature that would permit uniquely identifying the person.

Where the captured data element is an image of a person, as also described elsewhere herein, the removal of at least one biometric feature can include detecting a face subregion of the operational image and masking the face subregion, whereby the face and facial features are removed. The removal of biometric features can also include detecting a body subregion of the operational image and randomly distorting the body subregion. Accordingly, the anonymized operational image includes an image of the person captured but with the face subregion removed (or masked) and the body subregion being distorted. The person captured in the anonymized operational image is unidentifiable.

The second computer-implemented classification module receives the anonymized operational data element and processes the anonymized operational data element to determine a respective characterizing feature dataset.

Unlike the first computer-implemented classification module that operates on privacy-sensitive captured data elements, the second computer-implemented classification module only processes data elements that have been anonymized and therefore are substantially less privacy-sensitive. The anonymized data element can be free of any privacy-sensitive information. Accordingly, the same level of privacy-aware measures does not need to be taken for the operation of the second computer-implemented classification module. Notably, the operating of the second computer-implemented classification is non-restricted to any location having the geographic commonality with the monitored geographic location. For greater clarity, the second computer-implemented classification module can be implemented on computing nodes that are located outside the boundaries of geographic commonality with the monitored geographic location.

Additionally or alternatively, the operating of the second computer-implemented classification to process the anonymized operational data element is non-restricted to being completed within a time interval after initially receiving the operational data element from the secure source in which the time interval is shorter than the temporal threshold duration. For greater clarity, the processing of the anonymized operational data element is not bound by the temporal threshold duration imposed by applicable legislation or regulations and the anonymized operational data element can be retained beyond that temporal threshold duration. Therefore, the processing of the anonymized operational data element can be completed after surpassing the retention time limit. According to various example embodiments, a plurality of anonymized operational data elements can be received and retained beyond the temporal threshold duration and the plurality of anonymized operational data elements can be processed in a single batch by the second computer-implemented classification module.

The operation of the second computer-implemented classification module applied to anonymized operational data element outputs respective anonymized characterizing feature datasets. As described elsewhere herein, where the captured data element is an image of person, the anonymized characterizing feature dataset does not include any biometric features that uniquely identify the person captured in the operational image used to generate that dataset. In particular, the determination of the anonymized characterizing feature set is free of applying any unique identification of the captured person based on biometric information, whether physical, physiological and/or behavioral. The anonymized characterizing feature dataset can include a characterizing color pattern and accessory elements extracted from the anonymized body subregion. These elements can be extracted from clothing information (ex: top, bottom, shoes, hat etc.) and/or accessory information (ex: handbag, jewelry, etc.) found in the anonymized body region.

For each given one of the training data elements of the second subset, the given training data element is anonymized prior to being used as an anonymized training data element to train the second computer-implemented classification module by machine learning. Like the anonymizing of the operational data element, the anonymizing of the training data element is carried out by one or more computing nodes physically located at one geographic location each having a geographic commonality with the monitored geographic location where the given training data element was captured. This represents a first privacy-aware measure in the anonymizing of the training data element. Additionally, or alternatively, the anonymizing of the training data element is completed within a training time interval from the receiving of the training data element from a secure source. This training time interval can be the same time interval taken by the first classification module to complete training of the first module by machine learning using the training data element, in which the time interval is shorter than the temporal threshold duration. This represents a second privacy-aware measure in the anonymizing step of the training image. The anonymizing outputs an anonymized training image.

As described elsewhere herein, anonymizing the training data elements includes applying an active step to remove at least one feature within the captured data element that would otherwise permit the identification of the person captured in the data element. The at least one feature can be a biometric feature that would permit uniquely identifying the person.

Where the captured data element is an image of a person, as also described elsewhere herein, the removal of at least one biometric feature can include detecting a face subregion of the training image and masking the face subregion, whereby the face and facial features are removed. The removal of identifying features can also include detecting a body subregion of the training image and randomly distorting the body subregion. Accordingly, the anonymized training image includes an image of the person captured but with the face subregion removed (or masked) and the body subregion being distorted. The person captured in the anonymized training image is unidentifiable.

The anonymized training data element is used to train the second computer-implemented classification module by machine learning. Unlike the first computer-implemented classification module that is trained using privacy-sensitive captured data elements, the second computer-implemented classification only processes data elements that have been anonymized and therefore are substantially less privacy-sensitive. The anonymized data element can be free of any privacy-sensitive information. Accordingly, the same level of privacy-aware measures does not need to be taken for the training of the second computer-implemented classification module by machine learning. Notably, the training of the second computer-implemented classification module by machine learning using the anonymized training data element is non-restricted to any location having the geographic commonality with the monitored geographic location. For greater clarity, the second computer-implemented classification module can be implemented on computing nodes that are located outside the boundaries of geographic commonality with the monitored geographic location.

Additionally or alternatively, the use of the anonymized training data element to train the second computer-implemented classification module by machine learning is non-restricted to being completed within a time interval after initially receiving the training data element from the secure source in which the time interval is shorter than the temporal threshold duration. For greater clarity, the used of the training data element is not bound by the temporal threshold duration imposed by applicable legislation or regulations and the anonymized operational image can be retained beyond that temporal threshold duration. Therefore, the training of the second computer-implemented classification using the anonymized training data element can be completed after surpassing the temporal threshold duration. According to various example embodiments, a plurality of anonymized training data elements can be received and retained beyond the temporal threshold duration and the plurality of anonymized training images can be used as a single batch to training the second computer-implemented classification module by machine learning. This can be offline learning of the second computer-implemented classification module.

According to various example embodiments, training of the second computer-implemented classification module by machine learning includes querying a second human expert to annotate anonymized training data elements of the second subset to be used for training. For this annotation step, training data elements of the second subset having been anonymized are transmitted to at least one computing device used by the at least one second human expert and displayed on the computing device to the second human expert. The transmission and the displaying of the anonymized training data elements of the second subset at the at least one computing device of the second human expert are non-restricted to having geographic commonality with the monitored geographic location where the training data elements were initially captured. For greater clarity, the computing devices used by the second human expert to annotate the anonymized training data elements can be located outside the boundaries of geographic commonality with the monitored geographic location.

The annotation of the anonymized training data elements in the process of training the second computer-implemented classification by machine learning can be non-restricted to being completed within a training time interval after initially receiving the training data elements from the secure source in which the time interval is shorter than the temporal threshold duration. Where this process includes querying the second human expert to annotate the anonymized training data element, the annotation also does not need to be completed within the training time interval. For greater clarity, the annotation of the anonymized training data element can be completed after the expiry of the temporal threshold duration after the receiving of the training data element. As mentioned herein above, this allows for offline learning of the second classification module.

Referring back to FIG. 10, the illustrated exemplary privacy-aware training-enabled analysis system 300 includes one or more geographically unrestricted computing nodes 400 that are configured to implement the second computer-implemented classification module. The computing nodes 400 can implement both the operation of the second classification module for determining respective characterizing feature datasets from anonymized operational data elements as well as the machine learning of the second classification module using anonymized training data elements. It will be appreciated that the geographically unrestricted computing nodes 400 are placed to the left of the boundary line 340 to indicate that they are located outside the boundaries of geographic commonality with the monitored geographic location corresponding to the camera surveillance system 8. The geographic unrestricted computing nodes 400 can be a cloud-based computing system. Since it is not restricted to having geographic commonality with the monitored geographic location, the implementation of the unrestricted computing nodes 400 can leverage the flexibility of cloud-based computing systems by shifting computing resources of the cloud over different geographic territories over time in a substantially unrestricted manner.

As described hereinabove, the anonymizing of operational data elements and of training data elements of the second subset are carried out at computing nodes having geographic commonality with the monitored geographic location. According to the example illustrated in FIG. 10, either one or both, of the on-site computing node 356 and off-site computing nodes 360 of the computing nodes 332 can be used to carry out the anonymizing of the operational data elements and of the training data elements. The operational data elements and the training data elements after being anonymized by the on-site computing node 356 and/or off-site computing node 360 are then transmitted across the boundary line 340 to the geographically unrestricted nodes 400.

Referring back to FIG. 11, privacy-aware training-enabled system 300 is illustrated as having an anonymized data storage 408 which stores anonymized operational data elements and anonymized training data elements. As illustrated, these anonymized data elements are received from either one, or both, of on-site nodes 356 and off-site nodes 360. As described in more detail hereinabove, the legislatively defined temporal threshold duration on retention of privacy-sensitive information (ex: images allowing unique identification of captured persons) does not apply to the anonymized data elements. Accordingly, the anonymized operational data elements and the anonymized training data elements can be stored for a duration of time that is longer than the temporal threshold duration. At any time, which may be after the expiry of the temporal threshold duration, the anonymized operational images and the anonymized training images can be received at the geographically unrestricted nodes 400 implementing the second computer-implemented classification module to carry out the processing of anonymized operational images to generate characterizing feature datasets and to train the second computer-implemented classification module by machine learning, as described hereinabove.

The geographically unrestricted nodes 400 are placed above the boundary line 340 in FIG. 11 to indicate that it can be located outside the boundaries of the geographic commonality with the monitored geographic location.

The anonymized data storage 408 is placed in FIG. 11 to the right and above the boundary line 340 to also indicate that the data storage 408 can be located outside the boundaries of geographic commonality with the monitored geographic location. However, it will be understood that in other example embodiments, the data storage 408 can be located within the boundaries of geographic commonality with the monitored geographic location, such as at the site of the monitored space. It will be understood that despite having geographic commonality with the monitored geographic location, the data storage 408 can store the anonymized data elements (ex: video streams and images) beyond the temporal threshold duration.

Figure 13:
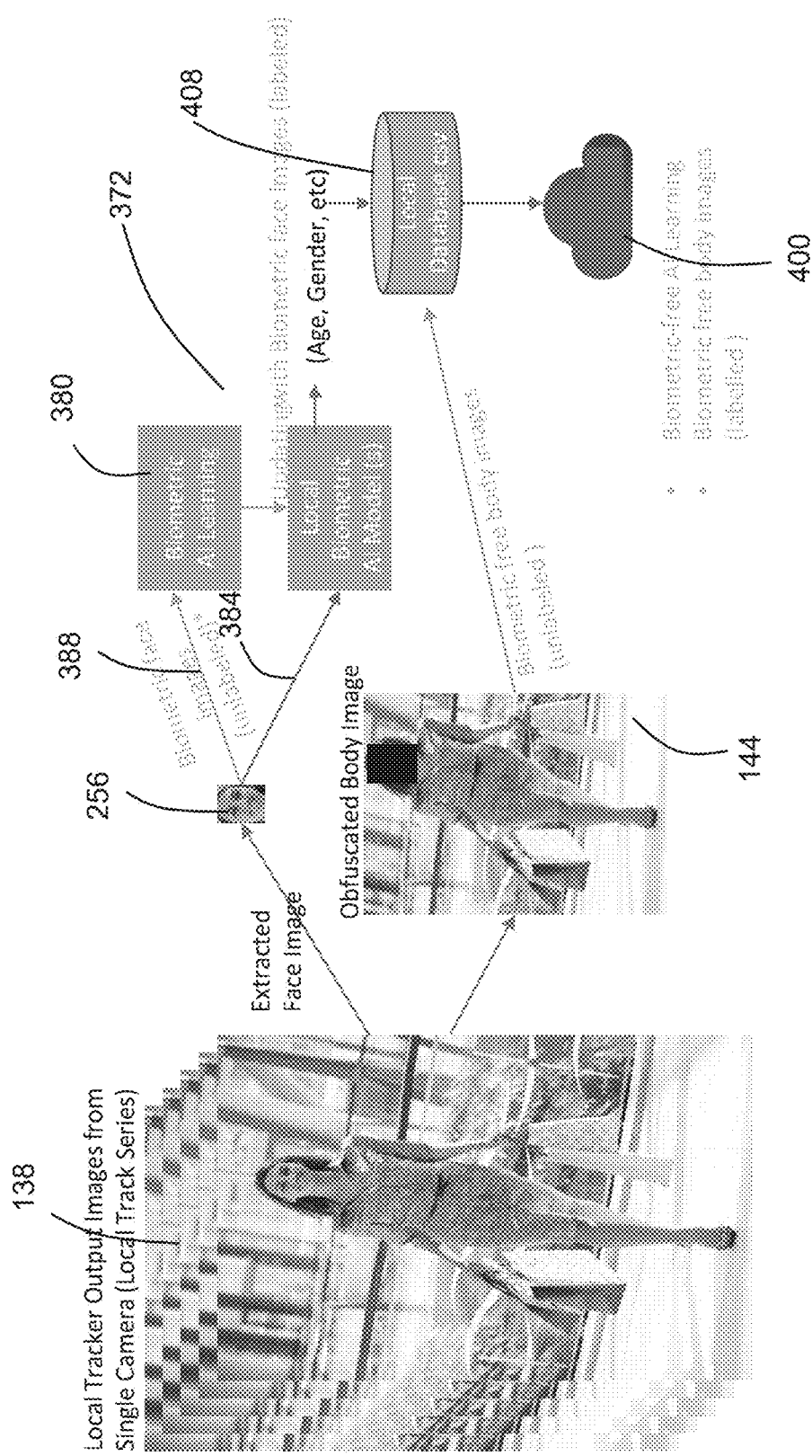
FIG. 13 illustrates a schematic diagram graphically showing the processing steps for generating the contextual dataset and the characterizing feature data with online learning according to one example embodiment.

Referring now to FIG. 13, therein illustrated is a schematic diagram graphically showing the processing steps for generating the contextual dataset and the characterizing feature dataset while also implementing online learning of the classification modules according to one example embodiment. This configuration can be a modification of the processing illustrated in FIG. 5c with reference to the privacy-aware analysis system 1, but with the addition of continuous learning applied to the classification modules used therein.

A series of images 138 are captured at a monitored location. The face subregion 256 is extracted, which will be the operational images and training images processed by the first computer-implemented classification module according to its AI model 372. Operational images 384 having the face subregions are fed to a biometric artificial intelligence model 372 of the first computer-implemented classification module, whereby the module determines respective contextual datasets. Training images 388 of these face subregions 256 are fed to machine learning module 380 to train the biometric artificial intelligence model 372 of the first computer-implemented classification module. The contextual dataset that is outputted, and which has been anonymized, are stored in data storage 408. It will be appreciated that this data track operates on privacy-sensitive images and that the privacy-aware measure(s) described herein are applied.

Continuing with FIG. 13, captured images are also anonymized to produce anonymized images 144. In the illustrated example, the anonymized images 144 are in the form of images having a masked face image and distorted body sub-region. These anonymized images 144 are stored at the data storage 408, whereby they may be used at a future time by a second computer-implemented classification module to generate characterizing feature datasets and to train the computer-implemented classification module by machine learning.

FIG. 14 shows a breakdown of the types of images that are stored and/or received at different locations. In particular, different types of images (anonymized or not) are shown with respect to whether the computing device treating or storing a given type of image has geographical commonality with the monitored geographic location. This is represented by boundary line 340, wherein devices to the left of the boundary lien 340 have geographic commonality with the monitored geographic location and devices to the right of the boundary line 340 do not have geographical commonality with the monitored geographic location.

Various example embodiments of computer-implemented classification modules described herein allow for online learning using data elements captured from the actual operating environment. It will be appreciated that the online learning using the training data elements captured from the operating environment should improve the performance of the classification module over time because the features and filters applied in the classification module will become more adapted to characteristics of the operating environment. This provides some optimization to the performance of the classification module applied to the specific operating environment. Moreover, solutions described herein provide for online learning while taking privacy-aware measures.

For example, where different monitored spaces can have different camera parameters and configurations, lighting, and presence of background objects that are particular to each space. The online learning of a classification module after it has been deployed at a tracked space optimizes the module for the monitored space.

Examples embodiments described hereinabove pertain to the online learning of one or more classification modules for a single operating environment. According to various example embodiments, multiple classification modules of the same type can be deployed at the same time, or over time, in different operating environments. The classification modules are of the same type in that they carry out the same type of processing, such as processing operational data elements to determine the contextual dataset for captured data elements. According to such embodiments having multiple classification modules and multiple operating environments, a federated learning process can be applied to the multiple classification modules that have undergone online learning for their respective operating environments.

According to various example embodiments, the training of a classification module by online learning using captured training data elements can be carried out in a semi-supervised manner. In particular, this form of training can be applied to the first classification module that processes operational data elements having privacy-sensitive information. According to one example embodiment, a generative adversarial network (GAN) can be used in an unsupervised portion of the training. The human expert then participates to provide supervised quality assurance of the progress of the generative adversarial network. The use of GAN can widen the privacy-aware boundaries (temporal restrictions and/or geographic restrictions) that are imposed on privacy-sensitive information in that less human intervention is required. This can make such privacy-aware systems less costly to operate.

Figure 15:
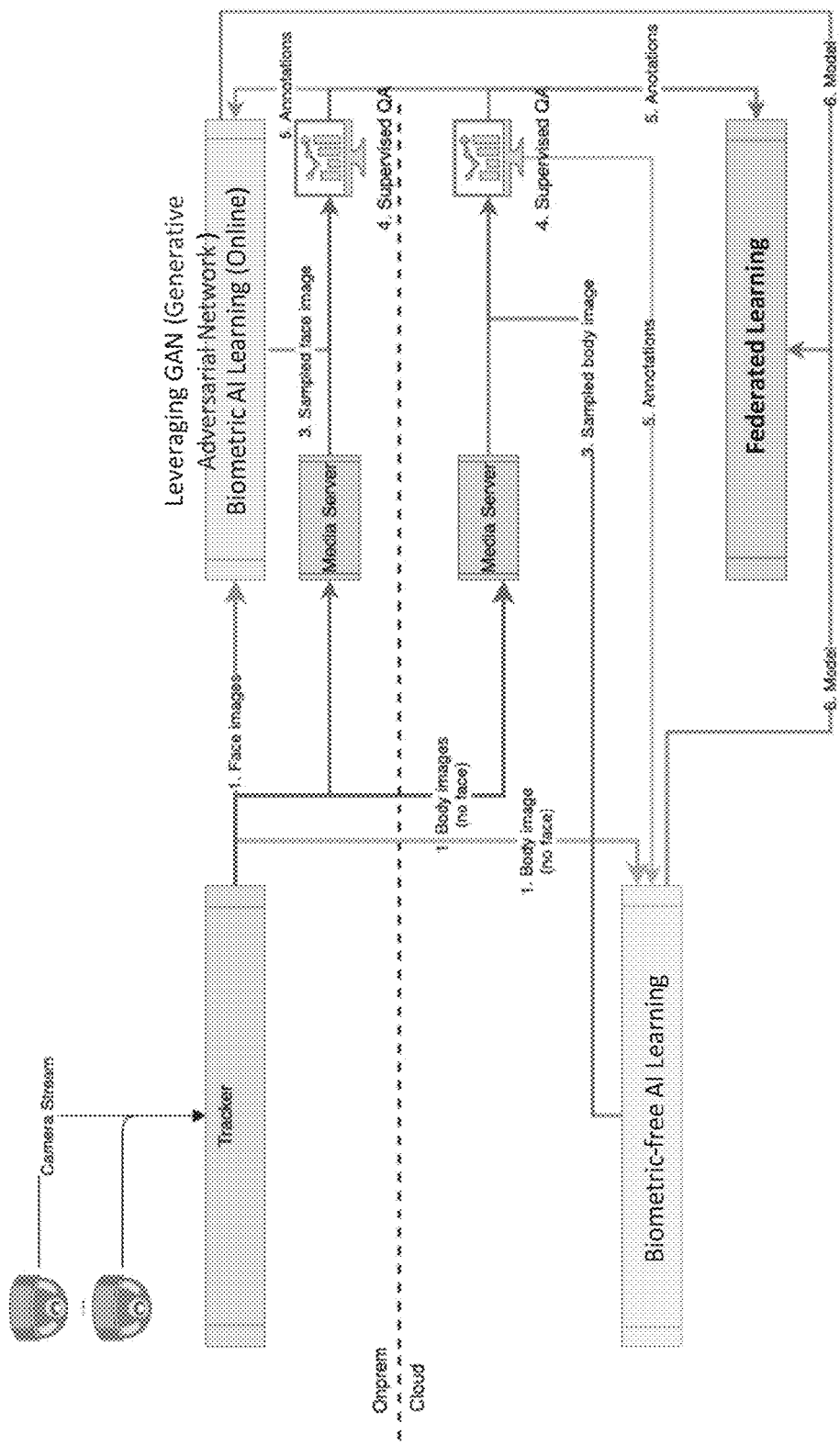
FIG. 15 illustrates a schematic diagram of one example embodiment of the privacy-aware training-enabled system having the generative adversarial network, supervised quality assurance and federated learning according to one example embodiment.

FIG. 15 illustrates a schematic diagram of one example embodiment of the privacy-aware training-enabled system having the generative adversarial network, supervised quality assurance and federated learning.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A method for privacy-aware movement tracking, the method comprising:
receiving a first series of images containing movement of a first unidentified person;
generating a first movement dataset for the first unidentified person based on tracking movement of the first unidentified person within the first series of images;
determining a first characterizing feature set for the first unidentified person;
associating the first characterizing feature set with the first movement dataset, thereby forming a first track entry;
receiving a second series of images containing movement of a second unidentified person;
generating a second movement dataset for the second unidentified person based on tracking movement of the second unidentified person within the second series of images;
determining a second characterizing feature set for the second unidentified person;
associating the second characterizing feature set with the second movement dataset, thereby forming a second track entry; and
determining a match between the first track entry and the second track entry,
wherein:
for at least one given image of the first series of images, a first body region corresponding to the first unidentified person is anonymized by removing identifying features within the first body region, thereby generating a first anonymized body region;
for at least one given image of the second series of images, a second body region corresponding to the second unidentified person is anonymized by removing identifying features within the second body region, thereby generating a second anonymized body region;
the first characterizing feature set for the first unidentified person is determined based on processing of the first anonymized body region and is associated with the first movement dataset to form the first track entry;
the second characterizing feature set for the second unidentified person is determined based on processing of the second anonymized body region and is associated with the second movement dataset to form the second track entry.

2. The method of claim 1, wherein determining a match between the first track entry and the second track entry comprises determining a matching level between the first characterizing feature set and the second characterizing feature set.

3. The method of claim 1, wherein
the first series of images is captured of a first field of view;
the second series of images is captured of a second field of view.

4. The method of claim 3, wherein:
the first series of images is captured by a first camera having the first field of view; and
the second series of images is captured by a second camera having the second field of view.

5. The method of claim 3, wherein determining the match comprises:
determining whether the first track entry and the second track entry satisfy a set of constraints predetermined according to a physical relationship between the first field of view and the second field of view.

6. The method of claim 1, wherein determining the match between the first track entry and the second track entry indicates the first unidentified person and the second unidentified person are the same real-world person.

7. The method of claim 1, wherein if a match between the first track entry and the second track entry is determined, the first movement dataset and the second movement dataset are linked.

8. The method of claim 1, wherein:
removing the identifying features within the first body region comprises removing at least one uniquely identifying biometric feature;
removing the identifying features within the second body region comprises removing at least one uniquely identifying biometric feature.

9. The method of claim 1, wherein:
removing the identifying features within the first body region comprises:
detecting a first face subregion within the first body region; and
masking the detected first face subregion; and
removing the identifying features within the second body region comprises:
detecting a second face subregion within the second body region; and
masking the detected second face subregion.

10. The method of claim 1, wherein:
removing the identifying features within the first body comprises randomly distorting the first body region to remove a silhouette of the first body region as a uniquely identifying feature; and
removing the identifying features within the second body comprises randomly distorting the second body region to remove a silhouette of the second body region as a uniquely identifying feature.

11. The method of claim 10, wherein:
randomly distorting the first body region comprises modifying the first body region by a first random aspect ratio; and
randomly distorting the second body region comprises modifying the second body region by a second random aspect ratio.

12. The method of claim 1, wherein the first characterizing feature set comprises one or more of a color pattern, accessory feature set, color features, clothing features and personal accessory features.

13. The method of claim 1, wherein:
the first characterizing feature set is insufficient for determining a unique identity of the first unidentified person; and
the second characterizing feature set is insufficient for determining a unique identity of the second unidentified person.

14. The method of claim 1, wherein:
the first characterizing feature set is determined without uniquely identifying the first unidentified person based on biometric information thereof; and
the second characterizing feature set is determined without uniquely identifying the second unidentified person based on biometric information thereof.

15. The method of claim 1,
wherein anonymizing the first body region and anonymizing the second body region are carried out at a secured network location; and
wherein the secured network location is shared with a surveillance system having a plurality of cameras.

16. A system for performing privacy-aware movement tracking, the system comprising:
at least one processor;
at least one memory coupled to the processor and storing instructions executable by the processor and that such execution causes the processor to perform operations comprising:
receiving a first series images of containing movement of a first unidentified person;
generating a first movement dataset for the first unidentified person based on tracking movement of the first unidentified person within the first series of images;
determining a first characterizing feature set for the first unidentified person;
associating the first characterizing feature set with the first movement dataset, thereby forming a first track entry;
receiving a second series of images containing movement of a second unidentified person;
generating a second movement dataset for the second unidentified person based on tracking movement of the second unidentified person within the second series of images;
determining a second characterizing feature set for the second unidentified person;
associating the second characterizing feature set with the second movement dataset, thereby forming a second track entry; and
determining a match between the first track entry and the second track entry;
wherein:
for at least one given image of the first series of images, a first body region corresponding to the first unidentified person is anonymized by removing identifying features within the first body region, thereby generating a first anonymized body region;
for at least one given image of the second series of images, a second body region corresponding to the second unidentified person is anonymized by removing identifying features within the second body region, thereby generating a second anonymized body region;
the first characterizing feature set for the first unidentified person is determined based on processing of the first anonymized body region and is associated with the first movement dataset to form the first track entry; and
the second characterizing feature set for the second unidentified person is determined based on processing of the second anonymized body region; and is associated with the second movement dataset to form the second track entry.

17. The system of claim 16, wherein determining a match between the first track entry and the second track entry comprises determining a matching level between the first characterizing feature set and the second characterizing feature set.

18. The system of claim 16, wherein:
the first series of images are captured of a first field of view; and
the second series of images are captured of a second field of view.

19. The system of claim 18, wherein:
the first series of images is captured by a first camera having the first field of view; and
the second series of images is captured by a second camera having the second field of view.

20. The system of claim 18, wherein determining the match comprises:
determining whether the first track entry and the second track entry satisfy a set of constraints predetermined according to a physical relationship between the first field of view and the second field of view.

21. The system of claim 16, wherein determining the match between the first track entry and the second track entry indicates the first unidentified person and the second unidentified person are the same real-world person.

22. The system of claim 16, wherein if a match between the first track entry and the second track entry is determined, the first movement dataset and the second movement dataset are linked.

23. The system of claim 16, wherein:
removing the identifying features within the second body region comprises removing at least one uniquely identifying biometric feature;
removing the identifying features within the second body region comprises removing at least one uniquely identifying biometric feature.

24. The system of claim 16, wherein:
removing the identifying features within the first body region comprises:
detecting a first face subregion within the first body region; and
masking the detected first face subregion; and
removing the identifying features within the second body region comprises:
detecting a second face subregion within the second body region; and
masking the detected second face subregion.

25. The system of claim 16, wherein:
removing the identifying features within the first body comprises randomly distorting the first body region to remove a silhouette of the first body region as a uniquely identifying feature; and
removing the identifying features within the second body comprises randomly distorting the second body region to remove a silhouette of the second body region as a uniquely identifying feature.

26. The system of claim 25, wherein:
randomly distorting the first body region comprises modifying the first body region by a first random aspect ratio; and
randomly distorting the second body region comprises modifying the second body region by a second random aspect ratio.

27. The system of claim 16, wherein the first characterizing feature set comprises one or more of a color pattern, accessory feature set, color features, clothing features and personal accessory features.

28. The system of claim 16, wherein:
the first characterizing feature set is insufficient for determining a unique identity of the first unidentified person; and
the second characterizing feature set is insufficient for determining a unique identity of the second unidentified person.

29. The system of claim 16, wherein:
the first characterizing feature set is determined without uniquely identifying the first unidentified person based on biometric information thereof; and
wherein the second characterizing feature set is determined without uniquely identifying the first unidentified person based on biometric information thereof.

30. The system of claim 16, wherein:
anonymizing the first body region and anonymizing the second body region are carried out at a secured network location; and
the secured network location is shared with a surveillance system having a plurality of cameras, including the first camera and the second camera.

* * * * *